United States Patent [19]
Tachikawa et al.

[11] Patent Number: 5,844,235
[45] Date of Patent: Dec. 1, 1998

[54] OPTICAL FREQUENCY DOMAIN REFLECTOMETER FOR USE AS AN OPTICAL FIBER TESTING DEVICE

[75] Inventors: Yoshihiko Tachikawa; Yoshihiro Sampei; Takaaki Hirata; Makoto Komiyama; Yasuyuki Suzuki; Mamoru Arihara, all of Tokyo, Japan

[73] Assignee: Yokogawa Electric Corporation, Tokyo, Japan

[21] Appl. No.: 727,377

[22] PCT Filed: Jan. 30, 1996

[86] PCT No.: PCT/JP96/00170

§ 371 Date: Sep. 27, 1996

§ 102(e) Date: Sep. 27, 1996

[87] PCT Pub. No.: WO96/24038

PCT Pub. Date: Aug. 8, 1996

[30] Foreign Application Priority Data

| Feb. 2, 1995 | [JP] | Japan | 7-015719 |
| Feb. 2, 1995 | [JP] | Japan | 7-015720 |
| Feb. 9, 1995 | [JP] | Japan | 7-021618 |
| Feb. 10, 1995 | [JP] | Japan | 7-022430 |
| Aug. 23, 1995 | [JP] | Japan | 7-214686 |
| Sep. 11, 1995 | [JP] | Japan | 7-232366 |

[51] Int. Cl.$^6$ .................................................. H01J 5/16
[52] U.S. Cl. ............................... 250/227.14; 250/227.12
[58] Field of Search ..................................... 356/73.1, 345, 356/349; 250/227.14, 227.12, 227.18, 227.19, 227.27, 227.15

[56] References Cited

U.S. PATENT DOCUMENTS

| 4,708,471 | 11/1987 | Beckmann et al. | 356/73.1 |
| 4,732,469 | 3/1988 | Souma | 356/73.1 |
| 5,453,826 | 9/1995 | Sugimoto et al. | 356/73.1 |

*Primary Examiner*—Que Le
*Attorney, Agent, or Firm*—Moonray Kojima

[57] ABSTRACT

In the primary invention of this application, an optical-fiber inspection device which detects the distance to a reflection point within the DUT and the amount of reflected light by dividing into two a laser beam which is possible to be frequency-swept, making one of the divided light beams incident to an optical detector via the reference light path, while making the other of the divided light beams incident to the DUT and making the light reflected within the DUT incident to the said optical detector, and analyzing the frequency of the interference signal for the two beams obtained by the optical detector, is configured so that the final reference light is obtained by providing an optical coupler in the reference light path and, after taking out a part of the reference light and making it pass through an optical frequency shifter, combining this again with the original reference light with the said optical coupler.

6 Claims, 22 Drawing Sheets

OPTICAL FREQUENCY DOMAIN REFLECTOMETER FOR USE AS AN OPTICAL FIBER TESTING DEVICE

BACKGROUND OF THE INVENTION

1. Field of the Invention

The present invention relates to an optical-fiber inspection device and more particularly to an improvement in the extension of its measurable region and an enhancement of its resolution in measuring the distance to a fault point.

2. Description of the Prior Art

There are two well-known optical-fiber inspection device thus far: the Optical Time Domain Reflectometer (OTDR) and Optical Frequency Domain Reflectometer (OFDR). The present invention relates to an optical-fiber inspection device of an OFDR scheme which identifies a fault point in a section of optical fiber by frequency information obtained by detecting the reflected light from the fault point above.

FIG. 1 shows an example of a theoretical configuration drawing of an OFDR using a fiber interferometer in the prior art. A laser beam emitted from laser diode (LD) module 1 is controlled by LD driver 2 to sweep its frequency. The laser beam is equally divided into two by optical coupler 3; one is propagated through a path 3a and incident to an optical detector, photo-diode (PD) 5. The other is incident to a section of optical fiber 4, a device under test (DUT), and reflected at a fault point 4a (e.g., fracture) in the optical fiber. This reflected light is propagated through a path 3b via optical coupler 3 and incident to PD 5. PD 5 detects interference between these two light beams (the interfering means is omitted).

The output of the PD is analyzed with spectrum analyzer 6 employing a method, e.g., Fast Fourier Transform (FFT), and the frequency and intensity of the interference light. In addition, LD driver 2 gives a trigger to spectrum analyzer 6 for the timing of the measurement.

In this configuration, the oscillation frequency of LD 1 is swept linearly so that the sweeping is $\Delta f$ per unit time ($\Delta t$). If a time difference t1 exists between the light directly incident to PD 5 via the optical coupler and the light incident to PD 5 after being reflected in the DUT, the frequency difference between these two light beams f1 is expressed as shown below.

$$f_1 = (\Delta f/\Delta t) \times t_1$$

This time difference is proportional to the distance from the light-incident end of the optical fiber to a fault (fault point 4a) where reflection occurs within the DUT and, for example, expressed in the next expression (the lengths of paths 3a and 3b must be the same).

$$t_1 = 2 \times L/V$$

where L is the distance up to a fault point. (As light advances and returns the same distance, 2×L is used).

V is the speed of light within the DUT. (Let the speed of light in a vacuum be c, and the refractive index of the DUT be n; then, V=c/n.)

From the above equations, if the sweeping rate ($\Delta f/\Delta t$) of the oscillation frequency is kept constant (already known), the distance to the fault point (position of the fault point) in the DUT can be known from the frequency of the interference signal at the PD, and the reflected amount at the fault point can be known from the magnitude of the interference signal. This enables an inspection device for an optical fiber or the like to be configured.

In this case, the measurable distance is limited by the coherence length of the light source used. The coherence length Lc is given by the following equation in a simplified form:

$$Lc = (c/n) \times (1/\Delta v)$$

where c is the speed of light in a vacuum n is the refractive index of the medium $\Delta v$ is the line width of the light source (frequency)

For example, if an optical fiber where n=1.5 and an LD with a line width of 1 MHz are used, the coherence length Lc is 200 m, that is, up to a distance of 100 m or so can be measured for the one-way distance. To extend the measurable distance, a light source with a narrower line width is required. However, it is not easy to provide a light source whose light emitting frequency can be swept and whose line width is narrow.

As a method to increase the measuring distance, there is a method of extending the path of the reference light. As shown in FIG. 2, it is a method to connect an extended optical fiber 3c with a length h. This makes measurement of a fault point possible in a range from the forward and return length h within a DUT to the coherence length Lc. However, the following problems remain even in such a measuring distance extension.

Although the measuring distance can be extended by implementing measurement replacing the extension optical fiber 3c with longer ones, there are problems that such measurements require a provision of multiple numbers of long optical fibers and has the necessity of incorporating a manual means of replacement or a channel selector or the like for these optical fibers.

For example, to measure a forward distance of 1 km for a coherence length of 200 m, 9 sections of optical fiber with lengths of 200 m, 400 m . . . , 1400 m, 1600 m, and 1800 m respectively become necessary. Although it is possible to obtain a 600 m fiber by connecting two lengths of optical fiber 200 m and 400 m long, a slight reflection at the connection point may cause ghosting.

In addition, in the configuration in FIG. 3 showing another example of an OFDR, the following problem exists: a light beam (e.g., a laser beam) emitted from electro-optic converter 13 (hereafter abbreviated as E/O converter) corresponding to LD1 in FIG. 1 is driven by the output of sweep oscillator 11 given via distributor 12, and controlled so that the intensity-modulation frequency for the output light is swept. The output light is incident to DUT 4, the device under test, via optical coupler 3 and reflected at a fault point (e.g., fracture) in the DUT. The reflected light is incident to an opto-electrical converter 5 (hereafter called O/E converter) corresponding to the PD in FIG. 1, converted to an electrical signal, and input to mixer 14.

The output of the above sweep oscillator 11 is also connected to mixer 14 via distributor 12, and mixer 14 outputs a signal of the frequency difference between the two input signals. This signal is input to frequency analyzer 15 in which the frequency difference is analyzed.

Sweep oscillator 11 is swept linearly so that the frequency change of $\Delta f$ per unit time ($\Delta t$) is obtained. The frequency difference between the two inputs of mixer 14 is proportional to the delay time difference. As the delay time difference is proportional to the distance to a fault point in DUT 4, the distance to the fault point can be known by making a frequency analysis and the reflected amount at the fault point, that is, the size of the fault point can be known from the magnitude of the signal.

However, the following problems still exist because a signal based on the reflected light from a fault point located near the light-incident end of the DUT has a lower frequency in the output of mixer 14.

(1) Much noise is contained in the low-frequency components, such as 1/f noise, and, thus, it is difficult to analyze lower-intensity, lower-frequency signals.

(2) It is hard for a spectrum analyzer generally used as a frequency analyzer to analyze low-frequency signals.

In addition, a signal corresponding to the reflected light (the signal to be measured with a frequency analyzer) from a fault point located remote from the end of the DUT to which the incident light is applied may sometimes be difficult to be measured because its frequency becomes too high.

Further, if more than one fault point located close to each other within a DUT exists, and if an E/O converter having a highly coherent output (e.g., a laser beam) is used, there occurs a problem where light beams reflected from fault points located close to each other interfere with each other and generate noise components causing the fact that the fault points cannot be detected with a high resolution.

As seen above, it is difficult for conventional OFDR's to extend the measurable distance and also to perform fault point detection with a high resolution.

The purpose of the present invention is, considering the above discussed points, to realize an optical-fiber inspection device which can easily extend the measurable distance.

Another purpose of the present invention is to make available an optical-fiber inspection device which can detect fault points with a high resolution.

SUMMARY OF THE INVENTION

In an optical-fiber inspection device to detect the distance to a reflection point in a DUT and the amount of reflection, by dividing a light beam, whose frequency can be swept, into two, one beam being incident to a reference light path and the other beam being incident to the DUT, and frequency-analyzing the interference signal between two light beams, one through the reference light path and the other reflected and returned within the DUT, detecting them with an optical detector, one embodiment of the present invention to intend to achieve the above purposes configures the device to obtain the reference light by providing an optical coupler in the reference light path, taking out a part of the reference light, and after passing it through an optical frequency shifter, again combining it with said reference light with said optical coupler.

Such a configuration can detect fault points in a DUT located farther than the coherence length of the laser beam by providing a loop for increasing the length of the light path and a frequency shifter in the reference light path.

DESCRIPTION OF THE PREFERRED EMBODIMENT

Figure 1:
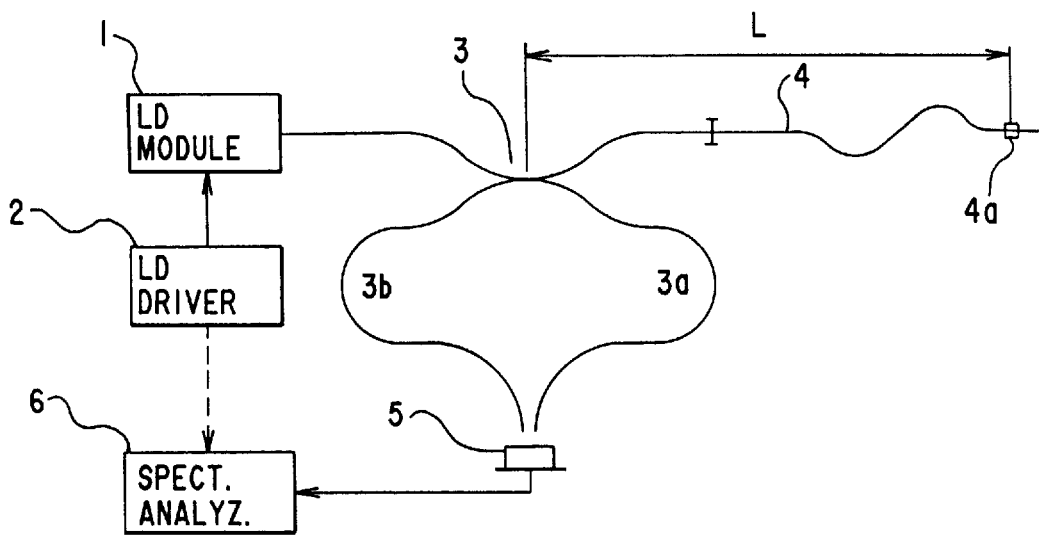
FIG. 1 is a configuration drawing showing an example of the optical-fiber inspection device in the prior art.
Figure 4:
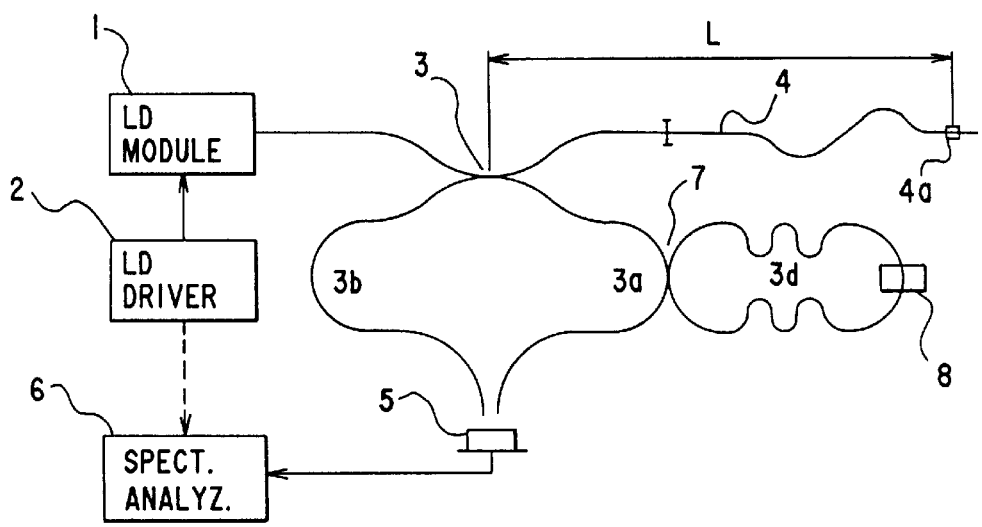
FIG. 4 is a configuration drawing showing an embodiment of the optical-fiber inspection device of the present invention.

Hereafter the present invention will be described in detail using drawings. FIG. 4 is a configuration drawing showing an embodiment of the optical-fiber inspection device of the present invention. The difference from FIG. 1 is that second optical coupler 7 is provided to branch a part of the reference light, to combine it again with optical coupler 7 after passing optical frequency shifter 8, and to use this as the final reference light.

The operation of the device in such a configuration is described below.

(1) In FIG. 4, the branching ratio of second optical coupler 7 is assumed to be x:y. However, x expresses the branching component in the directly advancing direction (direction from LD to PD) and y expresses the branching component in the crossing direction (direction from LD to frequency shifter 8) and also x+y=1, that is, there is assumed to be no coupler loss.

In addition, the direction to go from frequency shifter 8 to frequency shifter 8 again is determined to be x, and the direction to go from frequency shifter 8 to PD 5 to be y.

Further, it is assumed that, the light quantity that is incident to second coupler 7 is 1 (arbitrary unit), the light path length of the loop 3d is h and the shift of the optical frequency by frequency shifter 8 is s.

(2) First, the reference light only is described.

(a) The light incident to second optical coupler 7 is branched. The light incident directly to PD 5 has a light quantity x (=1×x), and the light path length in this case is assumed to be equal to the path length 3b in which the signal light passes (the path difference is zero).

The other branched light has a light quantity y (=1×y) and the path length is h and the shift of the optical frequency is s.

(b) The light whose frequency is shifted by s is again branched with optical coupler 7. The light toward PD has the light quantity y×y (=$y^2$), frequency shift s, and total path length difference (to the path length of the signal light) h.

The other branched light passes again through the frequency shifter and has a light quantity x×y, frequency shift s+s, and the path length is the previous path plus h and, thus, total 2h.

(c) This light is again branched with optical coupler 7. The light toward the PD has a light quantity x×y×y (=x×$y^2$), frequency shift 2s and total path length difference 2h.

The other branched light passes frequency shifter 8 and has a light quantity x×y×x (=$x^2$×y), frequency shift 2s+s, and the path length is the previous path plus h and, thus, total 3h.

(d) In a similar manner, the light toward the PD has a light quantity $x^2$×$y^2$, frequency shift 3s, and a total light path difference 3h.

And the next light toward PD 5 has a light quantity $x^3$×$y^2$, frequency shift 4s, and total light path length difference 4h.

Further, the next light toward PD 5 has a light quantity $x^4$×$y^2$, frequency shift 5s, and a total light path length difference 5h.

This procedure is repeated further on.

(e) Finally, the light of path length difference h×n, frequency shift s×n, and light quantity x (n=0) or $x^{n-1}$×$y^2$ (n=1, 2, 3, . . . ) is incident to PD 5. (n is the number of loops.)

(3) Next, interference with the signal light (the light reflected at a fault point in a DUT) will be described.

(a) For the position of a fault point (distance) L of $0 \leq 2L \leq h$:

The beat frequency when interfering with the n=0 component of the reference light is the same as the case in the past and so is $$f=(\Delta f/\Delta t) \times 2L/V$$

However, for beat frequency f' when interfering with the n=1 component of the reference light, as the light path difference is 2L−h and the frequency shift is s, $$f'=(\Delta f/\Delta t) \times (2L-h)/V+s$$

holds.

(b) For the position of a fault point (distance) L of $h \leq 2L \leq 2h$:

The beat frequency when interfering with the n=1 component of the reference light is $$f=(\Delta f/\Delta t) \times (2L-h)/V+s$$

However, beat frequency f' when interfering with the n=0 component of the reference light is, as the light path difference is 2L, $$f'=(\Delta f/\Delta t) \times 2L/V$$

Beat frequency f' when interfering with the n=2 component of the reference light is, as the light path difference is 2L−2h and the frequency shift is 2s, $$f'=(\Delta f/\Delta t) \times (2L-2h)/V+2s$$

(c) For the position of a fault point (distance) L of $2h \leq 2L \leq 3h$:

Beat frequency f when mainly interfering with the n=2 component of the reference light is $$f=(\Delta f/\Delta t) \times (2L-2h)/V+2s$$

However, beat frequency f' when interfering with the n=1 component of the reference light is, as the light path difference is 2L−h, $$f'=(\Delta f/\Delta t) \times (2L-h)/V+s$$

Also, beat frequency f' when interfering with the n=3 component of the reference light is, as the light path difference is 2L−3h and the frequency shift is 3s, $$f'=(\Delta f/\Delta t) \times (2L-3h)/V+3s$$

(4) The above items will be described in a tangible example in the following.

Assume that the coherence length of the light source is 200 m (the measurable distance in conventional inspection devices was about 100 m), the speed of light in a vacuum $3 \times 10^8$ m/s, the refractive index of the medium 1.5 (the speed of light V in the medium $V=3 \times 10^8/1.5=2 \times 10^8$ m/s), and the sweeping rate of the light-emitting frequency ($\Delta f/\Delta t$) $1 \times 10^{12}$ Hz/s.

Also assume that the light path length for 3d is 200 m, frequency shift s is 10 MHz, and the distance to fault point L is 50, 100, 250, and 350 m respectively.

(a) For a fault point 50 m distant, interference occurs with the n=0 component of the reference light and the beat frequency is:

$$f=(\Delta f/\Delta t) \times 2L/V=0.5 \text{ MHz.}$$

However, beat frequency f' when interference occurs with the n=1 component of the reference light is:

$$f'=(\Delta f/\Delta t) \times (2L-h)/V+s=9.5 \text{ MHz.}$$

(b) For a fault point 150 m distant, interference occurs with the n=1 component of the reference light and the beat frequency is:

$$f=(\Delta f/\Delta t) \times (2L-h)/V+s=10.5 \text{ MHz.}$$

However, beat frequency f' when interference occurs with the n=0 component of the reference light is:

$$f'=(\Delta f/\Delta t) \times 2L/V=1.5 \text{ MHz.}$$

This value exceeds the coherence length and so actually the frequency is seldom observed.

Beat frequency f' when interference occurs with the n=2 component of the reference light is:

$$f'=(\Delta f/\Delta t) \times (2L-2h)/V+2s=19.5 \text{ MHz.}$$

(c) For a fault point 250 m distant, interference occurs with the n=2 component of the reference light and the beat frequency is:

$$f=(\Delta f/\Delta t) \times (2L-h)/V+2s=20.5 \text{ MHz.}$$

However, beat frequency f' when interference occurs with the n=1 component of the reference light is:

$$f'=(\Delta f/\Delta t) \times (2L-h)/V+s=11.5 \text{ MHz.}$$

This value exceeds the coherence length and so actually the frequency is seldom observed.

Beat frequency f' when interference occurs with the n=3 component of the reference light is:

$$f'=(\Delta f/\Delta t) \times (2L-3h)/V+3s=29.5 \text{ MHz.}$$

(d) In a similar manner, for a fault point 350 m distant, interference mainly occurs for the n=3 component of the reference light and beat frequency f is $$f=30.5 \text{ MHz.}$$

However, for n=2, the beat frequency is 21.5 MHz but this is not observed and, for n=4, the beat frequency is 39.5 MHz.

Figure 5:
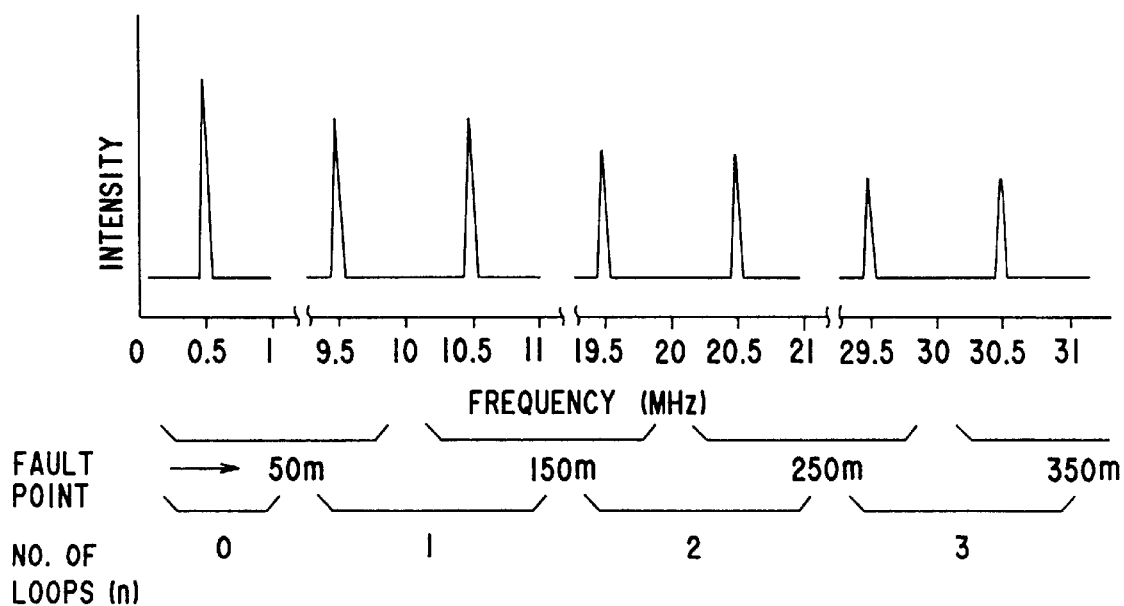
FIG. 5 is a diagram indicating the relationship between the beat signal frequencies and the intensities.

These beats are shown in FIG. 5. However, the reflected amount from each fault point (50, 150, 250, and 350 m) is assumed to be equal. The intensities of the beat frequencies in the figure are different because the reference light signal intensity decreases as the number of light-passings of the loop. This may be possible to be compensated depending on the branching ratio x:y of optical coupler 7.

The present invention is not limited to the above embodiment, for instance, an optical amplifier (optical fiber type) may be provided in light path 3c. This can cover losses due to branching. For example, if x:y=0.5:0.5, the intensity of light passing through the loop where frequency shifter 8 is located decreases to ½, but the light intensity incident to optical coupler 7 becomes 1 again by inserting an optical amplifier of gain 2, and, thus, it can keep the same level.

Using such a configuration, a fault point in a DUT whose distance is more than the coherence length (simple detection distance) of a laser beam can be detected by providing a loop which lengthens the light path length and a frequency shifter in the reference light path.

Figure 3:
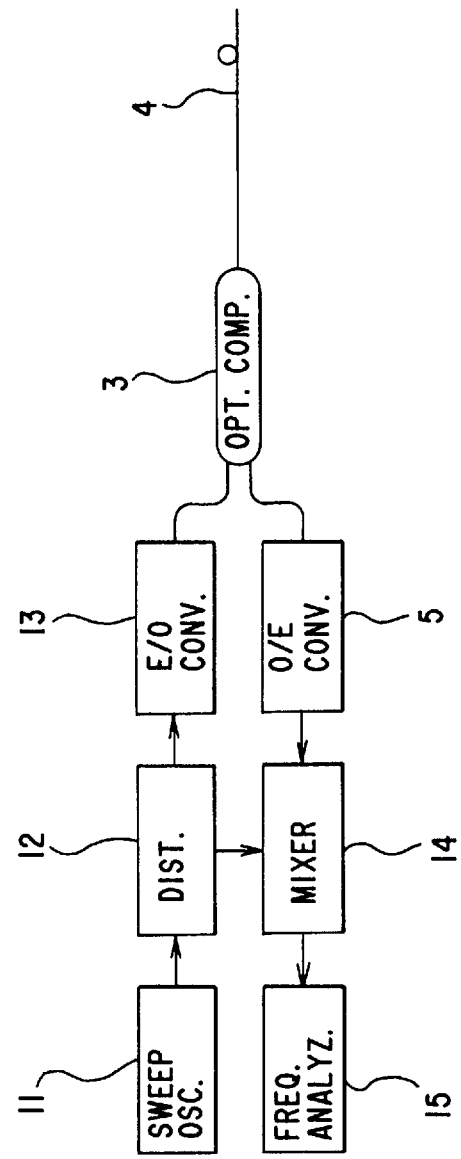
FIG. 3 is a configuration drawing showing further another example of the optical-fiber inspection device in the prior art.
Figure 6:
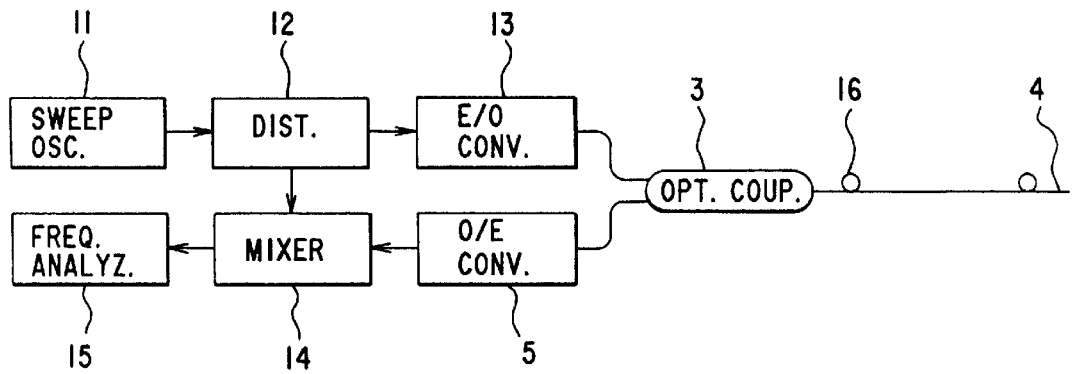
FIG. 6 through FIG. 19 are the configuration drawings showing other embodiments of the present invention.

The optical-fiber inspection device shown in FIG. 6 solves the problems which conventional optical-fiber inspection systems shown in FIG. 3 as described before have. This is an embodiment configured to be capable of precisely measuring a fault point whose distance within a DUT is extremely near or very far.

The configuration indicated in FIG. 6 is an example using optical fiber 16 as a means for a frequency shift between optical coupler 3 and DUT 4. If it is assumed for this configuration that DUT 4 is an optical fiber of refractive index n=1.5 and sweeping oscillator 11 sweeps at the rate (sweeping rate) of 1 GHz/sec, then the time t for the light to forward and return a distance of 1 m within the optical fiber is $$t = 2 \times n/c \approx 1 \times 10^{-8} \text{ (sec)}.$$

From the sweeping rate of sweep oscillator 11, the time t produces a frequency difference of 10 Hz. Therefore, by analyzing the frequency difference with frequency analyzer 15, the position of the fault point can be detected at 1 m/10 Hz.

In this case, the signal by a reflected light from the end face where DUT 4 is connected (in other words, the signal to be measured by frequency analyzer 15) is taken as 0 Hz. If DUT 4 is an optical-fiber 1 m long, the signal obtained by the light reflected at the open end of the fiber is 10 Hz.

If an optical-fiber 10 m long is provided as additional optical-fiber 16, the frequency to be analyzed with frequency analyzer 15 is the one shifted by 100 Hz toward a higher frequency. That is, if optical-fiber 16 is 10 m long and DUT 4 is an optical fiber 1 m long, the frequency of the signal obtained by the reflected light at the open end of DUT 4 (the signal to be analyzed with the frequency analyzer) is 110 Hz.

Figure 7:
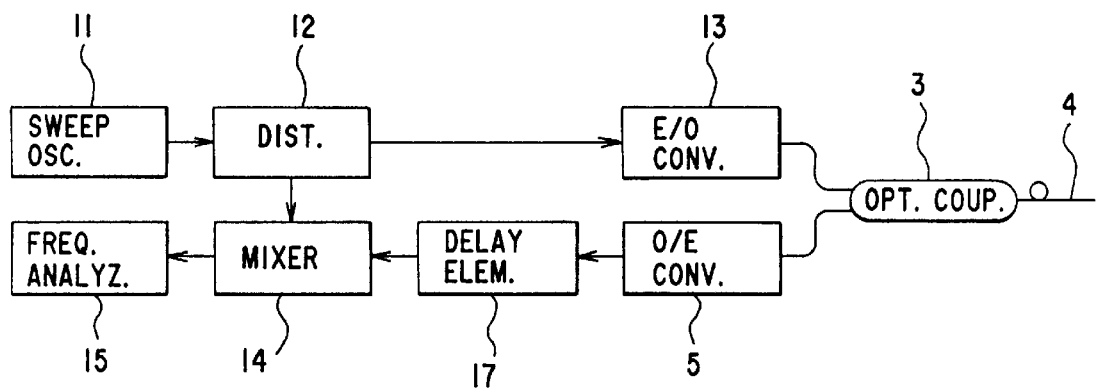

FIG. 7 shows the third embodiment of the present invention. This is an example using analog delay element 17 connected between O/E converter 5 and mixer 14 as a means to shift the frequency of the signal to be analyzed with the frequency analyzer to a frequency region where frequencies are measurable.

If, for example, an analog delay element of 100 ns is used, the frequency to be analyzed shifts by 100 Hz toward a higher frequency (since sweep oscillator 1 has a sweeping rate of 1 GHz/sec, a delay of 100 ns is equivalent to 100 Hz).

If DUT 4 is an optical-fiber 1 m long, the frequency of the signal by the light reflected at the open end of DUT 4 (the signal to be analyzed with the frequency analyzer) is 110 Hz.

Figure 8:
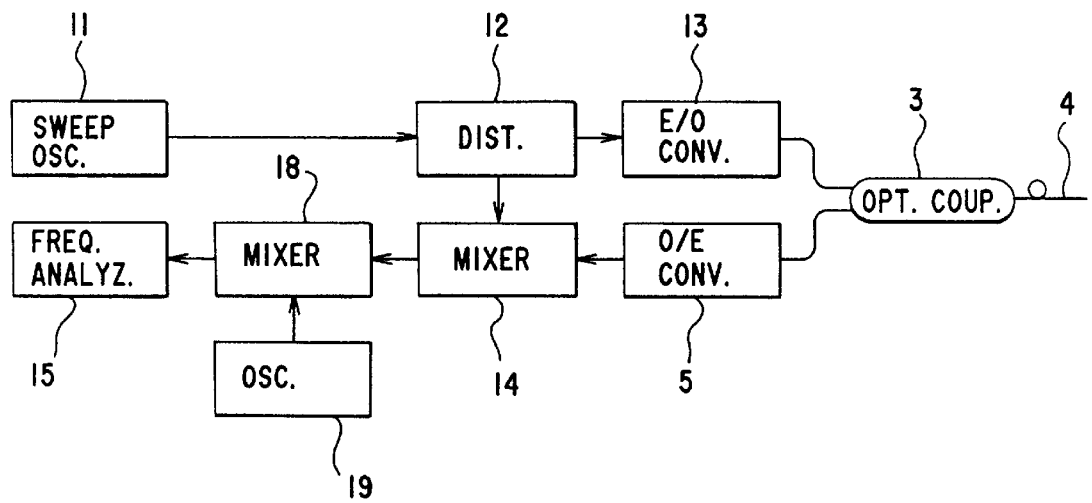

FIG. 8 shows the fourth embodiment of the present invention using second mixer 18 and oscillator 19 as a means to shift the frequency of the signal to be analyzed with the frequency analyzer to a frequency region where frequencies are measurable.

Mixer 18 is connected between first mixer 14 and frequency analyzer 15 to mix the output of first mixer 14 and the output of oscillator 19. By assuming the output frequency of oscillator 19 to be, for example, 100 Hz and by adding it to the output frequency of mixer 14 with mixer 18, the frequency to be analyzed can be shifted by 100 Hz toward higher frequencies.

If DUT 4 is assumed to be an optical-fiber 1 m long, the signal of the light reflected at the open end of DUT 4 (the signal to be analyzed with the frequency analyzer) is 110 Hz.

If a frequency of 50 kHz is prepared as the output of oscillator 19 and a frequency difference by mixer 18 is utilized, the frequency to be analyzed shifts by 50 kHz toward lower frequencies. By assuming DUT 4 is an optical-fiber 10 km long, the frequency of the signal of the light reflected at the open end of the DUT (the signal to be analyzed with the frequency analyzer) is 50 kHz.

Figure 9:
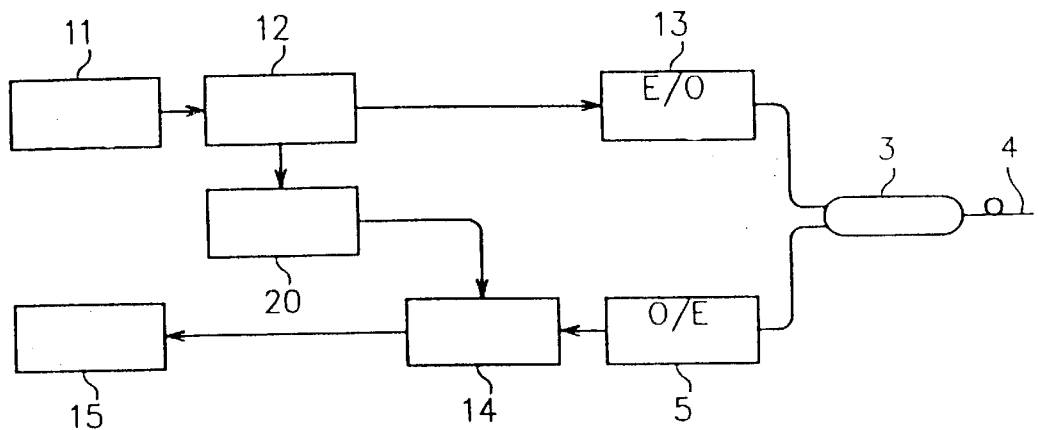

FIG. 9 shows the fifth embodiment of the present invention using analog delay element 20 as a means to shift the frequency of the signal to be analyzed with the frequency analyzer to a frequency region where frequencies are measurable.

This can shift the frequency of the signal to be analyzed with frequency analyzer 15 toward lower frequencies. If analog delay element 20 of, for example, 50 µs is used, the frequency to be analyzed shifts by 50 kHz to the low frequency side. If DUT 4 is an optical-fiber 10 km long, the frequency of the signal of the light reflected at the open end of DUT 4 (the signal to be analyzed with the frequency analyzer) is 50 kHz.

Figure 10:
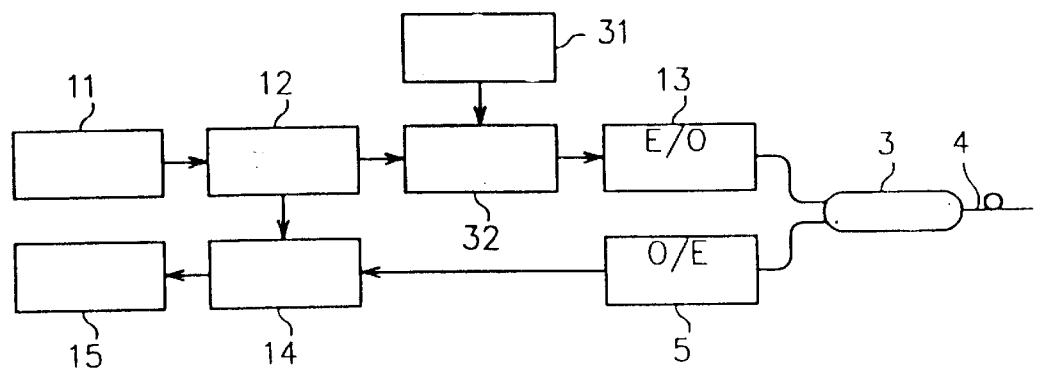

If multiple fault points are located close to each other in DUT 4 and an E/O converter having a highly coherent light, such as a laser beam, is used, there occurs a problem where light beams reflected from fault points located close to each other interfere with each other and cause noise components. FIG. 10 shows a configuration of an optical-fiber inspection device in the sixth embodiment of the present invention, which solves the above problem making the light given to the DUT become a low coherent one.

In FIG. 10, number 31 shows a high-frequency signal generator to generate high-frequency signals (waveform being, e.g., random sine waves), and 32 shows a composition unit which superimposes the output of high-frequency signal generator 31 on the output of distributor 12.

In such a configuration, E/O converter 13 is driven by the signal obtained by compositing the output signal of sweep oscillator 11 and the output signal of high frequency signal generator 31. In this case, a laser diode is used as E/O converter 13. This enables the laser diode to easily emit laser beams whose spectral line width is extended and also enables interference between light beams reflected from fault points to be prevented even if these multiple fault point locations are close to each other in DUT 4.

In addition, the frequency of the output signal of high-frequency signal generator 31 should be different from that of the output signal of sweep oscillator 11.

Figure 11:
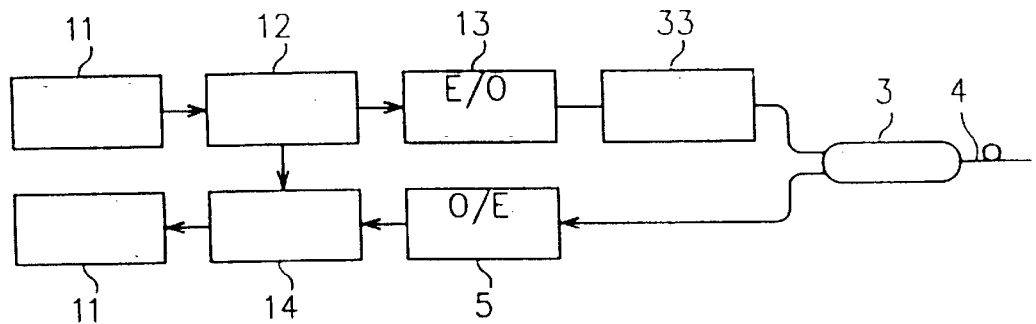

FIG. 11 shows the seventh embodiment of the present invention, in which a highly coherent laser beam (spectral line width 100 MHz or less) and an optical frequency shifter are used as a means to prevent interference between the light beams reflected from fault points by extending the spectral line width of the light to be given to DUT 4 over the spectral line width of the light from the original E/O converter.

In FIG. 11, number 33 shows a frequency shifter to extend the spectral line width by shifting the frequency of the output light of E/O converter 13. This can prevent interference between light beams reflected from fault points similar to those in the above embodiments.

The present invention is not limited to the above embodiments. For example, a laser beam whose spectral line width is 100 MHz or more may be used as E/O converter 13 without using a high frequency signal generator and a composition unit or frequency shifter 33 to obtain a similar effect. Also, a light emitting diode (LED) or a superluminescent diode (SLD) may be used as E/O converter 13.

Fault points located close to each other can also be found by utilizing Fourier Transform for the frequency analysis method.

Further, if the transmission loss of light is large, or if the reflected light quantity at the fault points is small, optical amplifiers (optical fiber type) may be provided.

In addition, if a section of optical fiber in service is to be measured, a wavelength different from that of the light in service may be used as an E/O converter output and, if necessary, a wavelength discriminator that eliminates unnecessary wavelengths may be used at the preceding stage of O/E converter 5. As a wavelength discriminator in this case, an optical filter, interference filter or absorption by a material may be used.

For instance, for testing a section of optical fiber operating with a wavelength of 1.55 μm, an E/O converter which emits the light of 1.65 μm may be used and, if necessary, a wavelength discriminator that eliminates the light with the 1.55 μm wavelength may be used at the preceding stage of an O/E converter.

The configuration shown in FIG. 10 or FIG. 11 can realize an optical-fiber inspection device which can detect fault points at high resolution (1 m or less) even if there are two fault points located nearby using a light source of a short coherence length (including a case where the short coherence length conditions can be obtained equivalently).

Figure 12:
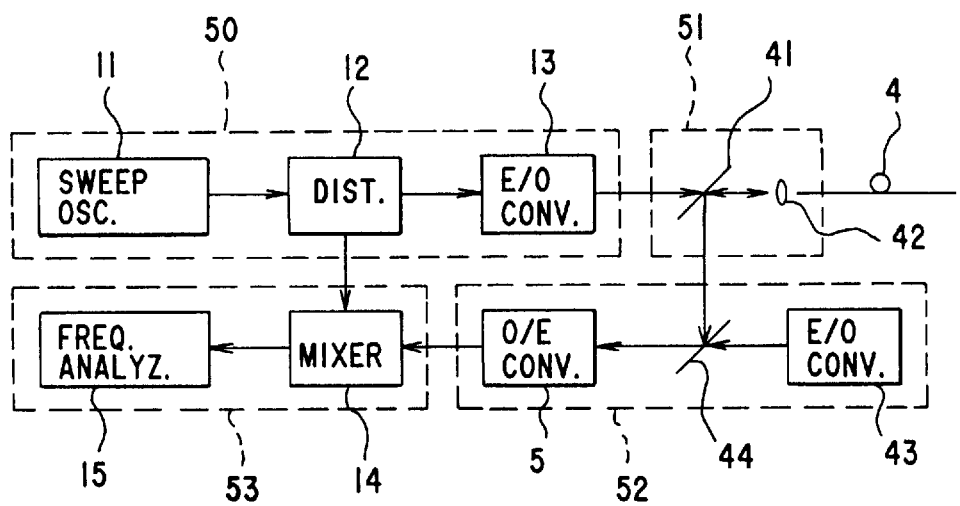

FIG. 12 shows the eighth embodiment of the present invention. It is an example of an optical-fiber inspection device which can inspect a section of optical fiber even if only slight reflection light can be obtained. If the reflected light intensity decreases due to a long distance to a fault point in DUT 4 or the small size of a fault point, a problem occurs where the above reflected light cannot be detected and the frequency difference cannot be obtained depending on the sensitivity of the optical detector. A device shown in FIG. 12 is intended to eliminate the problem.

In FIG. 12, number 41 shows a beam splitter and 42 a lens, 43 an E/O converter to output continuous light, and 44 a beam splitter. In addition, numbers 11 to 13 constitute intensity-modulated light source 50, 41 and 42 constitute optical means 51, 5, 43 and 44 constitute detection means 52, and 14 and 15 constitute analysis means 53, respectively. The output light of intensity-modulated light source 50 is incident to DUT 4 and reflection occurs at a fault point in DUT 4. This reflected light is combined with the output light of E/O converter 43 and they interfere with each other, and are then detected with O/E converter 5.

Mixer 14 composites the output of optical detector 5 and another output of distributor 12, in other words, the output of oscillator 11, and frequency analyzer 15 inspects DUT 4, such as the optical-fiber, based on the frequency difference between two input signals, that are outputs of mixer 14.

For instance, let the power of the reflected light from DUT 4 be E1 and the power of output light of E/O converter 43 be E2, and if these powers are selected to be $$E1 < E2 \qquad (1)$$

and the power E detected with O/E converter 5 after the interference is expressed as shown below by putting the optical frequency difference between them as $\Delta f_{opt}$, $$E \cong E1 + E2 + (E1 \cdot E2)^{1/2} \cos(\Delta f_{opt}) \qquad (2)$$

If it is assumed that E1=10 μW and E2=1 mW, from the third term of equation (2)

$$\begin{aligned}(E1 \cdot E2)1/2\cos(\Delta f_{opt}) \\ = (10 \times 10^{-6} \cdot 10^{-3})1/2\cos(\Delta f_{opt}) \\ = 100 \times 10^{-6}\cos(\Delta f_{opt}) \end{aligned} \qquad (3)$$

is obtained and an intensity-modulated signal about 10 times as strong as a conventional value when detecting power E1 of the direct reflection light can be obtained.

That is, even if the power of reflected light E1 is very weak, a necessary intensity-modulated signal can be obtained by detecting the third term of equation (2) with O/E converter 5 increasing the power E2 of the output light of E/O converter 43.

While, to the frequency output of mixer 14, optical frequency difference $\Delta f_{opt}$ between the two light beams interfering with each other in detection means 52 is added as an offset component.

That is, if $\Delta f_{opt}$=10 GHz, a frequency output, such as 10 GHz+10 Hz for the distance to the fault point in DUT 4 of 1 m, 10 GHz+100 Hz for DUT of 10 m, or 10 GHz+1 kHz for DUT of 100 m, can be obtained as a frequency output of mixer 14.

As a result, an optical-fiber inspection device which can inspect with a very weak reflected light by interfering the reflected light generated at the fault point located in DUT 4 with the output light of E/O converter 13 and detecting it with O/E converter 5, can be realized.

Figure 13:
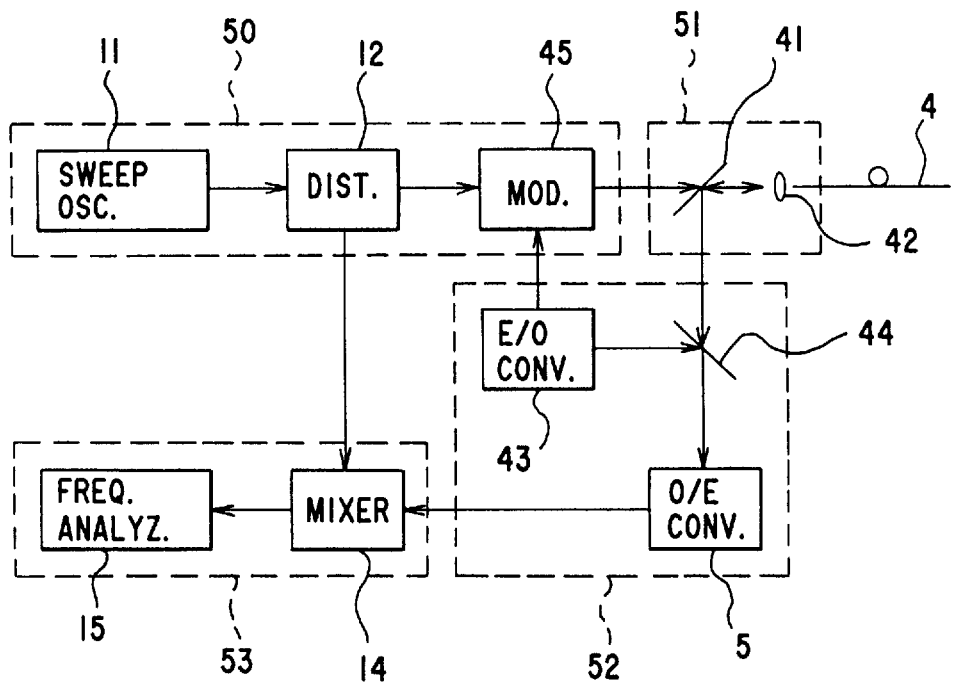

FIG. 13 shows a configuration drawing for the ninth embodiment of the present invention. In FIG. 13, number 45 shows a modulator. The other parts are the same as in FIG. 12. The output light of E/O converter 43 is intensity-modulated based on the output of distributor 12 in modulator 45 and is incident to DUT 4. Since the same E/O converter is used in the configuration shown in FIG. 13, the optical frequency difference $\Delta f_{opt}$ mentioned in the above equations (2) and (3) is zero.

That is, the offset component is zero and the frequency output of 10 Hz for the distance of the fault point within DUT 4 of 1 m, 100 Hz for the distance of 10 m, or 1 kHz for the distance of 100 m is obtained as the frequency output of mixer 14.

Figure 14:
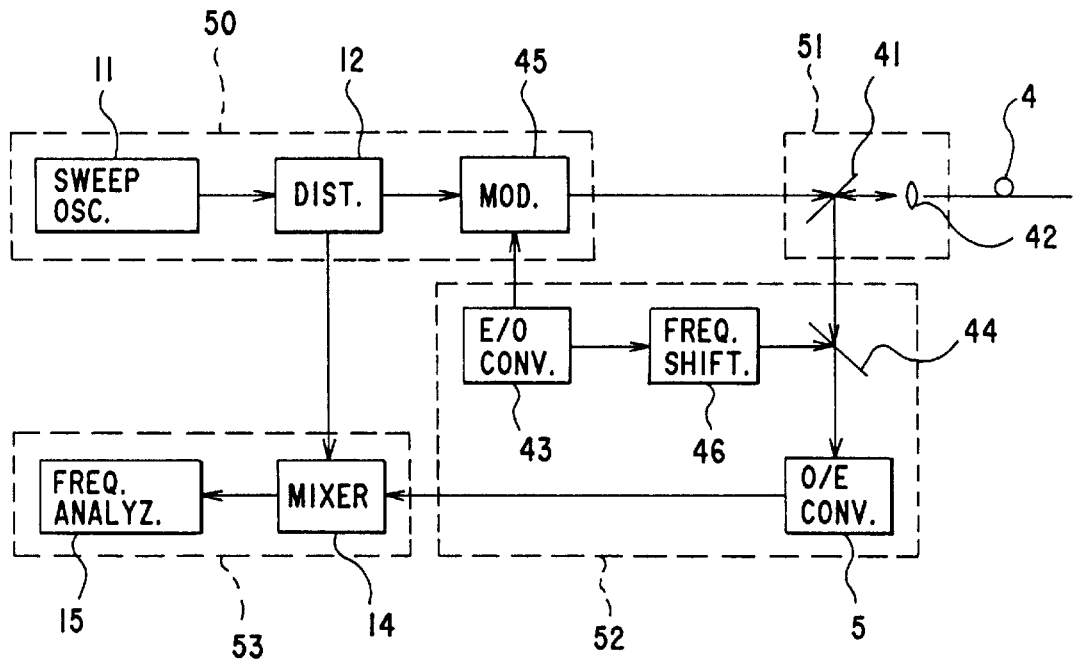

FIG. 14 shows the tenth embodiment of the present invention. Number 46 shows a frequency shifter, and the output light of E/O converter 43 is incident to beam splitter 44 via this frequency shifter 46. The operation is the same as the embodiment shown in FIG. 13 and the difference is that the light for interference is shifted with frequency shifter 46.

For this reason, however, a frequency component equivalent to the shift by frequency shifter 46 is added to the frequency output of mixer 14 as an offset component.

In addition, although frequency shifter 46 is provided between E/O converter 43 and beam splitter 44 in this configuration, frequency shifter 46 may be inserted between E/O converter 43 and modulator 45 or between beam splitter 41 and modulator 45.

Figure 15:
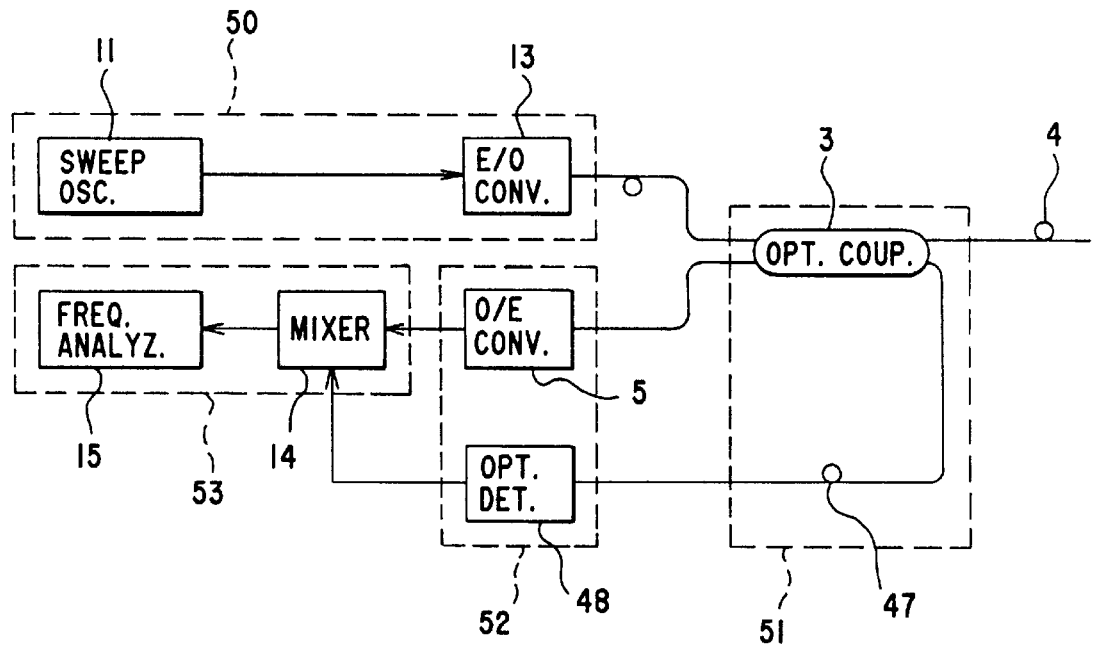

FIG. 15 shows a drawing of an optical-fiber inspection device which can detect a remote fault point in good resolution in an eleventh embodiment of the present invention. While the distance of a fault point that can be detected depends on the intensity of the reflected light, it also depends on the spectrum purity of intensity-modulated light. If the spectrum purity is low, the reflected light from a remote fault point shifts from sine waves and so the frequency analysis of the output of mixer 14 in FIG. 3 can hardly give good measurement of the frequency or peak power.

For example, the magnitude of a signal from a fault point 1000 m away measured with frequency analyzer 15 is 1/10 that of a signal from a fault point 100 m away. That is, if the spectrum purity is high, a signal is expressed with the following equation:

$$\sin(f_0 \cdot t) \qquad (4)$$

On the other hand, if the spectrum purity is low, the signal is regarded as superimposed waves whose frequencies are shifted little by little and expressed as shown below.

$$A_0 \sin(f_0 \cdot t) + A_1 \sin(f_0 \pm f_1)t + A_2 \sin(f_0 \pm f_2)t \qquad (5)$$

where $A_0+A_1+A_2+ \ldots =1$

For this reason, if the distance to a fault point is small and the phase differences between waves are small, the signal can be approximated with equation (4). However, if the fault point is located far away, the signal cannot be approximated with one wave, and so if it is detected with frequency analyzer 15, its intensity decreases and frequency information spreads, resulting in difficulties in frequency or peak power measurement.

Figure 2:
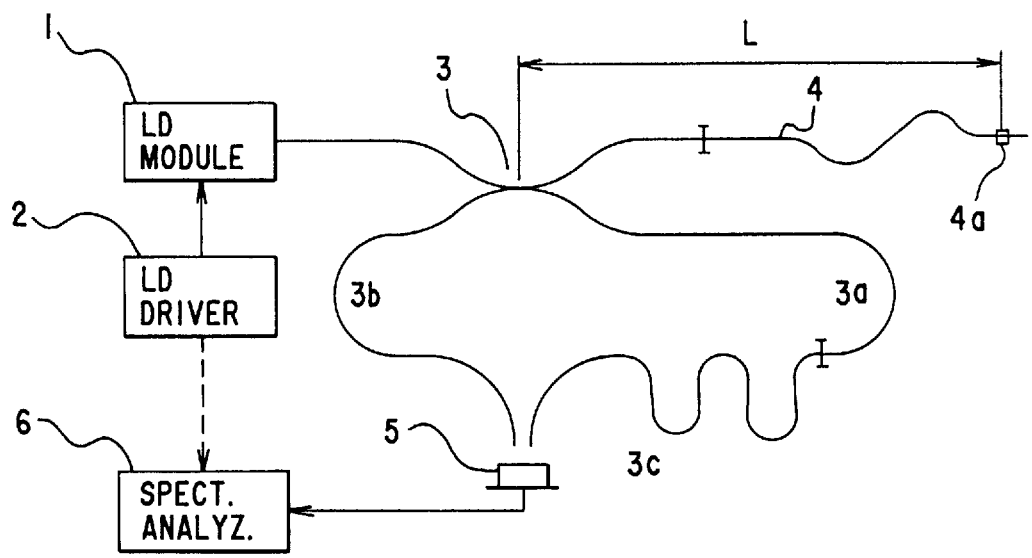
FIG. 2 is a configuration drawing showing another example of the optical-fiber inspection device in the prior art.

The optical-fiber inspection device shown in FIG. 15 eliminates such problems, in which number 47 indicates an optical delay element, such as an optical-fiber. The output of oscillator 11 is connected to E/O converter 13 whose output light is incident to optical coupler 3 (equivalent to the optical coupler in FIG. 1 to FIG. 3). One output light of optical coupler 3 is incident to DUT 4 and the other output light of optical coupler 3 is incident to optical delay element 47.

Reflected light from DUT 4 is incident to O/E converter 5 via optical coupler 3 and the output light of optical delay element 47 is incident to optical detector 48. The outputs of O/E converter 5 and optical detector 48 are connected to the two input terminals of mixer 14 and the output of mixer 14 is connected to frequency analyzer 15.

Hereafter the operation is described in this configuration. As the output of oscillator 11 drives E/O converter 13, the output light of E/O converter 13 is intensity-modulated by the output of oscillator 11. This intensity-modulated light is incident to DUT 4 and optical delay element 47 and the light reflected at the fault point located in DUT 4 is detected with O/E converter 5. On the other hand, the light incident to optical delay element 47 is delayed for a certain time in optical delay element 47 and then detected with optical detector 48.

These detected light beams are composited in mixer 14, and frequency analyzer 15 inspects DUT 4, such as an optical fiber, based on the frequency difference between the two input signals that are the output of mixer 14.

For example, if optical delay element 47 is 2000 m long and the distance to the fault point within DUT 4 is 1100 m, since the light incident to optical delay element 47 propagates by 2000 m, or the distance equivalent to 1000 m each way in DUT 4, the phase difference between a signal from the fault point in DUT 4 and the output signal of optical delay element corresponds to a distance of 100 m within DUT 4.

That is, if the detection signal of the light to be measured and the detection signal of the reference light are composited and their frequency difference is measured with frequency analyzer 15, measurements between the signals whose phase differences are shifted similarly are mainly made, and this can prevent extreme signal deterioration which was the problem in examples of conventional systems.

In addition, under the previously described conditions, a frequency output, such as 1 kHz for a distance of 1100 m to the fault point in DUT 4 or 10 kHz for the distance of 2000 m, can be obtained as the frequency output of mixer 14. This is because the reference light also causes a frequency change for 1000 m each way and therefore this is a condition where the frequency change for 1000 m is subtracted. As a result, by delaying the reference light by a fixed time within optical delay element 47, an extreme signal deterioration can be prevented and a remote fault point can be detected.

Figure 16:
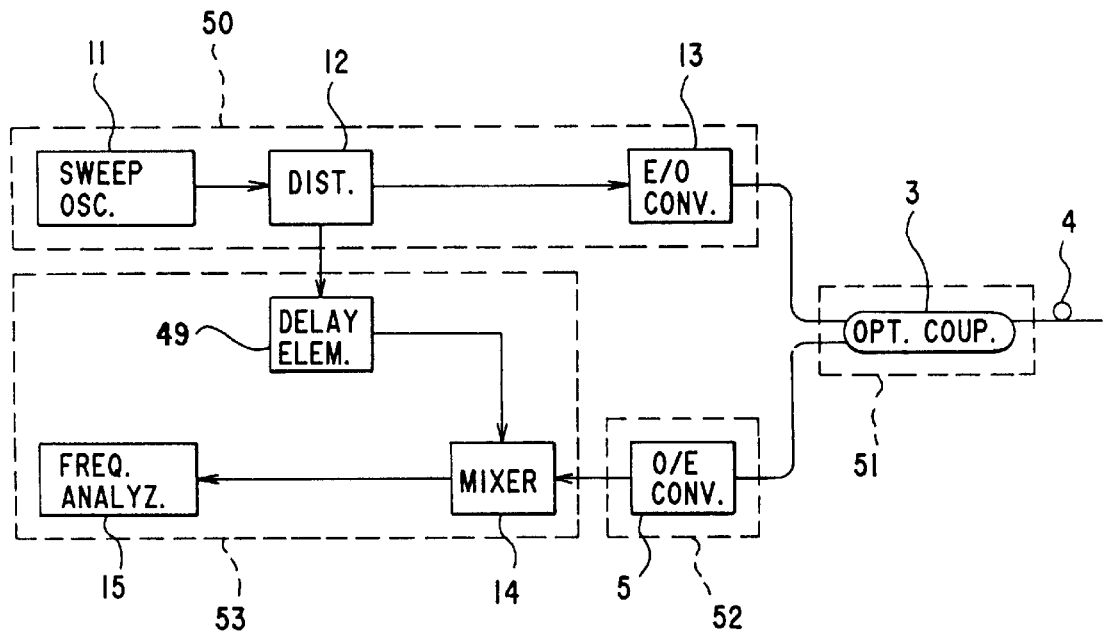

In addition, if the above configuration is modified to that shown in FIG. 16, a similar purpose can be accomplished. In FIG. 16, number 49 shows a delay element and numbers 14, 15, and 49 constitute analysis means 53a.

The output of oscillator 11 is connected to distributor 12, one output of distributor 12 is connected to E/O converter 13 and the other output of distributor 12 to delay element 49. The output of O/E converter 5 is connected to one input of mixer 14 and the output of delay element 49 to the other input of mixer 14. The output of mixer 14 is connected to frequency analyzer 15.

In this (twelfth) embodiment, the reference signal is distributed with distributor 12 and the departed signal is delayed by a fixed time with delay element 49. This delayed signal is composited with the detection signal detected with O/E converter 5 in mixer 14. This makes mixer 14 mainly implement measurement between both phase difference-shifted signals to prevent an extreme signal deterioration. For instance, if the delay time with delay element 49 is assumed to be 10 μs, the same frequency output as the case in FIG. 15 can be obtained. However, in the embodiments shown in FIG. 15 and FIG. 16, since the reference signal or light is subject to a frequency change corresponding to 1000 m each way, the condition in which a frequency change for 1000 m is always subtracted holds.

Accordingly, if a fault point is located 100 m distant, the frequency output should be 1 kHz without delay but 10 kHz is subtracted affected by the delay and, thus, 9 kHz is obtained as the frequency output. However, whether this signal is from the 100 m fault point or from the 900 m fault point cannot be identified.

Figure 17:
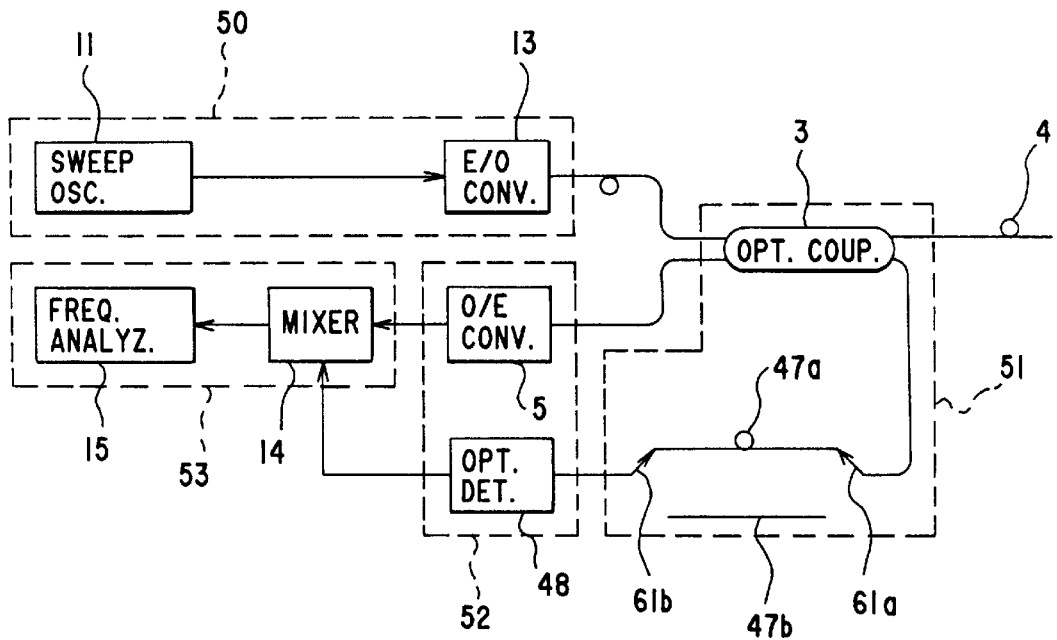

FIG. 17 shows a thirteenth embodiment of the present invention. Numbers 47a and 47b show optical delay elements and 61a and 61b, optical switch circuits.

In such a configuration, it is assumed that the delay in optical delay element 47a is equivalent to 2000 m and the delay in optical delay element 47b is equivalent to 0 m. For measuring DUT 4, 0 to 1000 m long, optical delay element 47b is selected with optical switch circuits 61a and 61b, and for measuring DUT 4, 1000 m to 2000 m, optical delay element 47a is selected with optical switch circuits 61a and 61b.

In measurement of DUT 4, 1000 m to 2000 m long, a similar problem of identification in the embodiments shown in FIG. 15 and FIG. 16 occurs. However, by referring to a measured result in DUT 4 of 0 to 1000 m long, e.g., whether it is a 100 m-fault point or a 900 m-fault point can be identified.

Figure 18:
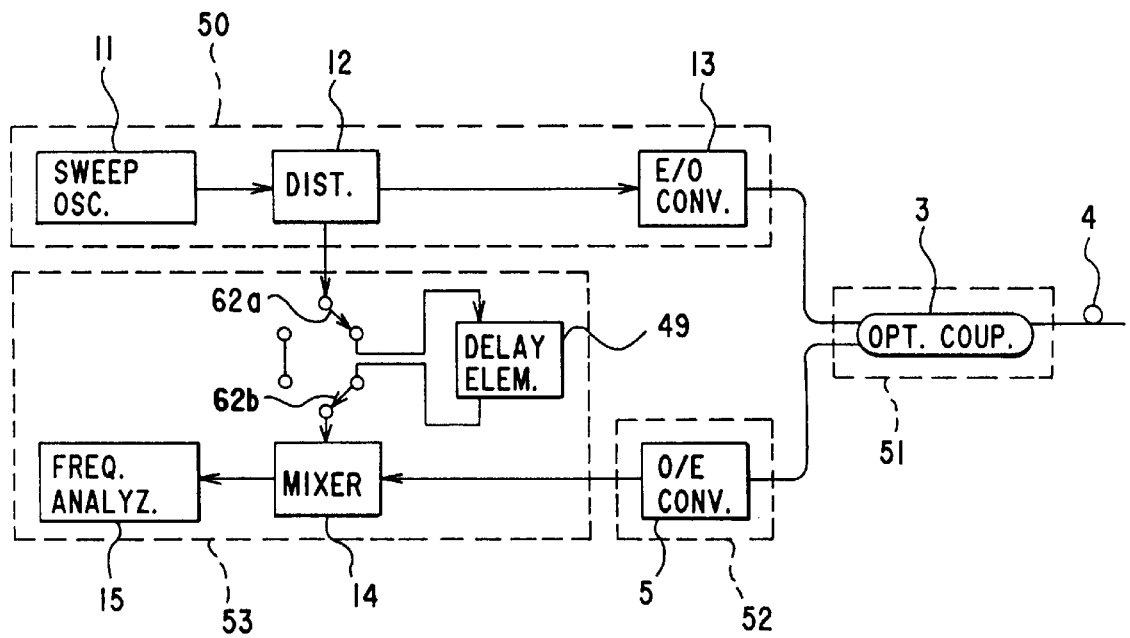

FIG. 18 shows a fourteenth embodiment of the present invention. Numbers 62a and 62b indicate switch circuits and a block composed of numbers 14, 15, and 49 including 62a and 62b constitute an analysis means 53b.

Operation of a device of such a configuration will be described below. This configuration is almost the same as the embodiment shown in FIG. 16 and can identify a signal from a fault point of 100 m or a fault point of 900 m by suitably selecting a delay with switch circuits 62a and 62b.

In the embodiments shown in FIG. 17 and FIG. 18, two delay amounts are selected for measurement. However, it is, of course, not limited to this but any of more than two delay amounts may be selected.

Figure 19:
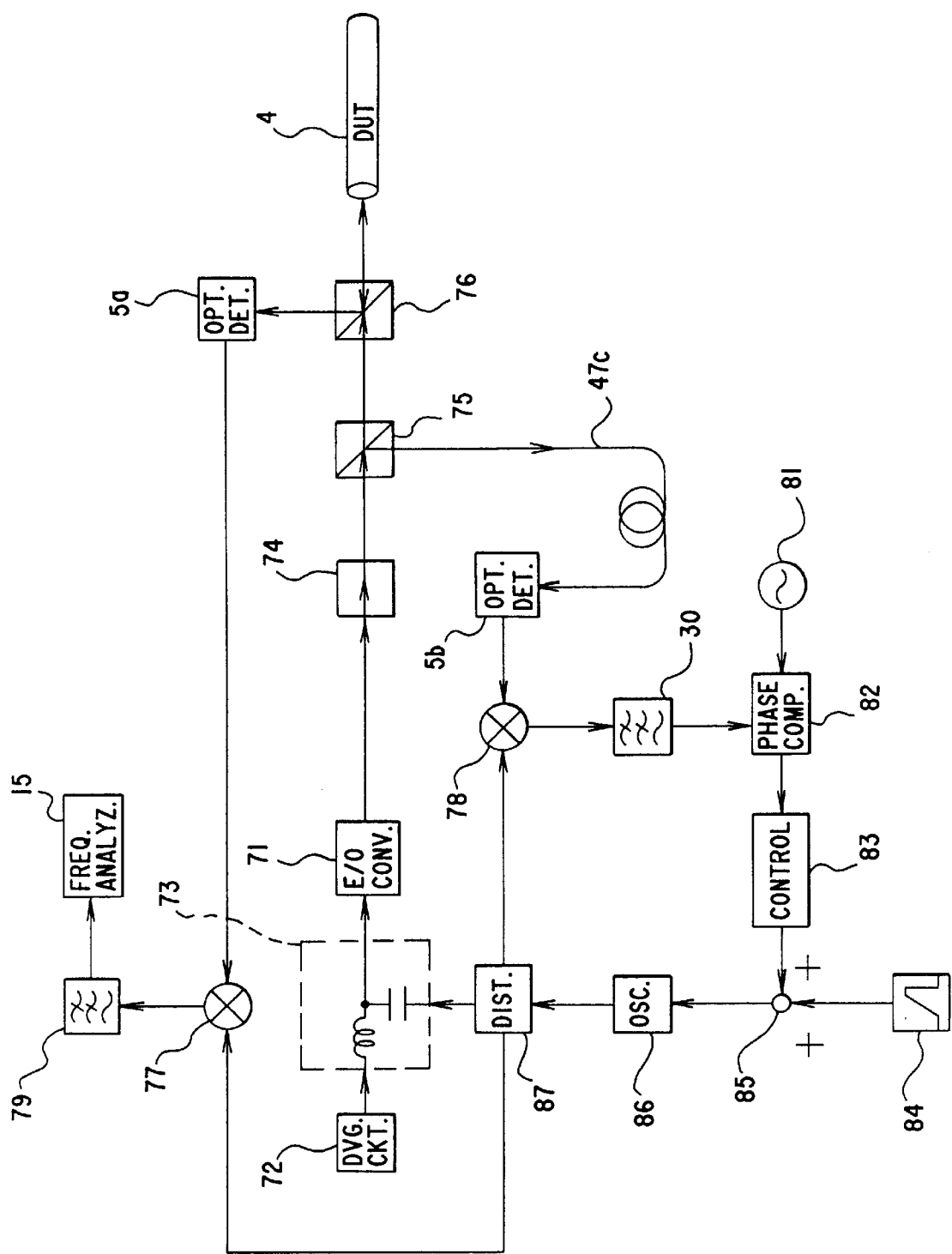

FIG. 19 shows a configuration drawing for a fifteenth embodiment of the optical-fiber inspection device concerning the present invention, which detects the optical frequency change per unit time and can sweep linearly a modulation frequency of light intensity. This device can improve the resolution and accuracy in measuring the distance to a fault point.

In FIG. 19, number 71 shows an E/O converter, 72 a driving circuit to drive the E/O converter with DC, 73 a composition unit to composite a DC signal and a high-frequency signal, 74 an optical isolator, 75 and 76 beam splitters to branch the light, 5a an optical detector to detect the reflected light from the fault point in DUT 4 (a section of optical fiber), 47c a delay circuit to delay the output light of beam splitter 75 and this is an optical fiber of a known length in this case.

Further, number 5b shows an optical detector to detect the output light of optical fiber 47c, 77 and 78 mixers, 79 and 80 low pass filters to transmit necessary low-frequency components only, 81 an oscillator to output a known frequency signal, 82 a phase comparator to detect a frequency or phase difference between the output of low-pass filter 80 and the output of oscillator 81, and 83 a control circuit to control a modulation frequency based on the output of phase comparator 82. Although the existence of low-pass filter 80 is preferable, there may be no problem in operation without it.

In addition, number 84 shows a modulation signal generator to output modulation signals, 85 an adder to add the output of control circuit 83 to the output of modulation signal generator 84, 86 a voltage-controlled oscillator whose output oscillation frequency varies with the output of adder 85, and 87 a distributor to branch the output of voltage-controlled oscillator 86.

Operation of a device of such a configuration will be described below. E/O converter 71 is driven by the output of drive circuit 72. The light emitted from E/O converter 71 is sent out after being transmitted through optical isolator 74 and beam splitters 75 and 76. The output frequency of voltage-controlled oscillator 86 is ramp-modulated by the output of modulation signal generator 84. The output of voltage-controlled oscillator 86 is branched into three with distributor 87 and each branched output is input to composite unit 73 and mixer 77 and 78, respectively.

Figure 20:
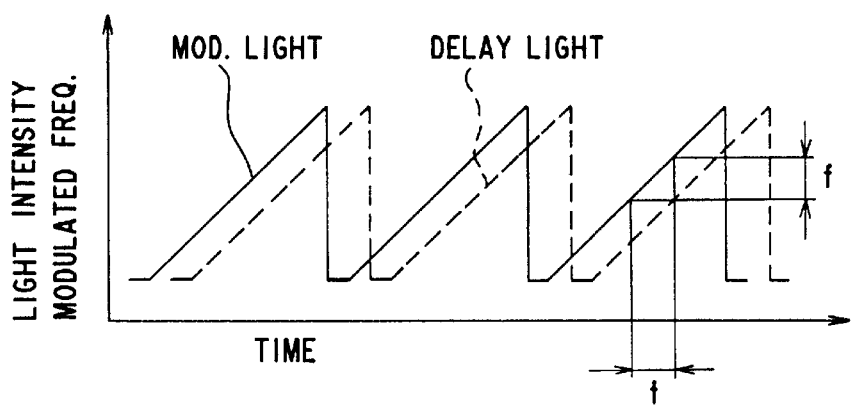
FIG. 20 is a diagram for illustrating the operation of the optical-fiber inspection device shown in FIG. 19.

When the output of distributor 87, i.e., the output of voltage-controlled oscillator 86 is added to composition unit 73, the modulation frequency for optical intensity of the output of E/O converter 71 is modulated in a ramp as shown in FIG. 20, the rate of frequency change "a" is expressed with (df/dt).

The externally output light is incident to a section of optical fiber 4 to be measured and returns to beam splitter 76 after being reflected at a fault point in the optical fiber and detected with optical detector 5a. The output of optical detector 5a is mixed with the output of distributor 87 in mixer 77.

If the distance to a fault point in a section of optical fiber 4 is L, there is a time difference Δt between the output of distributor 87 and the output of optical detector 5a.

$$\Delta t = 2 \cdot n \cdot L / c_0$$

where n: Refractive index of optical fiber 4

$c_0$: Speed of light in a vacuum

Therefore, in the output of mixer 77, the signal of a frequency which has changed during time difference Δt is contained in the output of mixer 77.

$$\Delta f = a \cdot \Delta t = 2 \cdot a \cdot n \cdot L / c_0$$

The output of mixer 77 is subjected to elimination of unnecessary frequency components with low-pass filter 79, and its frequency and signal intensity are analyzed with frequency analyzer 15. If the rate of change "a" is constant, the analyzed frequency is proportional to the distance to fault point L. Thus, the distance L can be calculated from the frequency, and the reflected amount of light can be determined from the signal intensity.

The light branched with beam splitter 75 transmits through delay circuit 47c of known length Lc and is detected with optical detector 5b. The output of optical detector 5b is mixed with the output of distributor 87 with mixer 78. Since a fixed time difference $$t = n \cdot Lc / c_0$$

is produced between the output of optical detector 5b delayed with delay circuit 47c and the output of distributor 87 as shown in FIG. 20, the difference in the modulation frequencies changed during the delay time, i.e., a signal with a frequency equal to the product of the rate of change of the modulation frequency (the amount of change in the modulation frequency per unit time) and the delay time in delay circuit 47c

$$f = a \cdot t = a \cdot n \cdot Lc / c_0$$

is output from mixer 78.

The output of mixer 78 is subjected to elimination of unnecessary frequency components with low-pass filter 80. If the rate of change of the modulation frequency is constant (linearly swept), the frequency of the signal output from low-pass filter 80 becomes constant. The frequency and phase of the signal output from low-pass filter 80 are compared to those of a signal of a known frequency output from oscillator 81 by phase comparator 82. Control circuit 83 outputs a control signal so that the frequency of the signal output from mixer 78 based on the output of phase comparator 82 becomes constant. The control signal output from control circuit 83 is added to the output of signal generator 84 in adder 85 and input to voltage-controlled oscillator 86.

In such a manner, the frequency of the signal output from mixer 78 becomes constant by the control of control circuit 83 and linear sweeping of the modulation frequency can be achieved.

Figure 21:
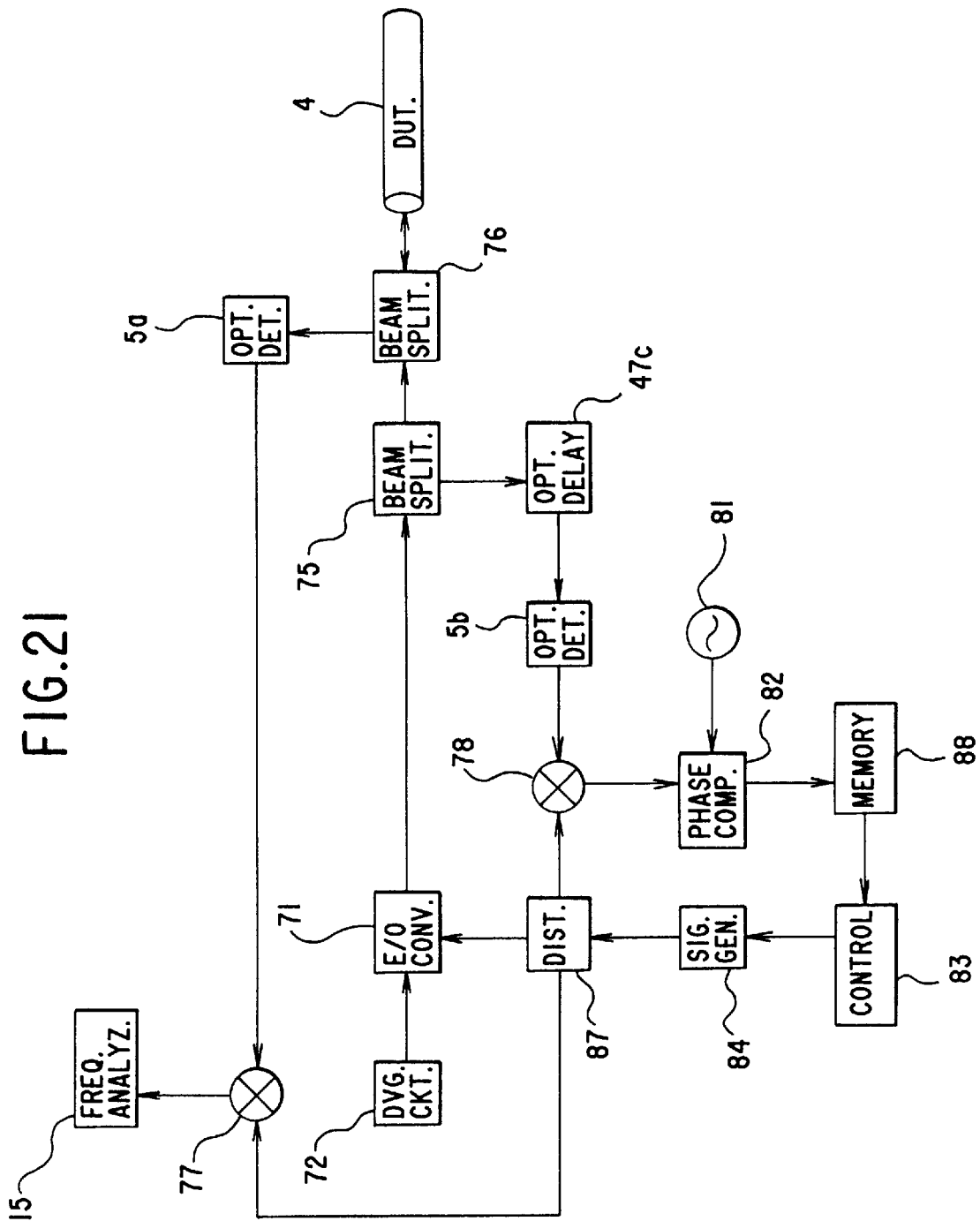
FIG. 21 through FIG. 32 are the configuration drawings showing further other embodiments of the present invention.

In this case, the linear sweeping control means which controls linear sweeping of the modulation frequency by detecting the amount of change in the modulation frequency for optical intensity per unit time providing a delay circuit, is not limited to the above embodiment but various versions are permitted. For example, as shown in FIG. 21, the output of phase comparator 82 may be stored in memory 88 and the data in memory 88 may be input to control circuit 83. In this case, control circuit 83 repeats linear sweeping control of the modulation frequency based on the data stored in memory 88.

In addition, from modulation signal generator 84, in this case, a signal whose frequency is modulated in a ramp is output. This is the same in the following embodiments.

Figure 22:
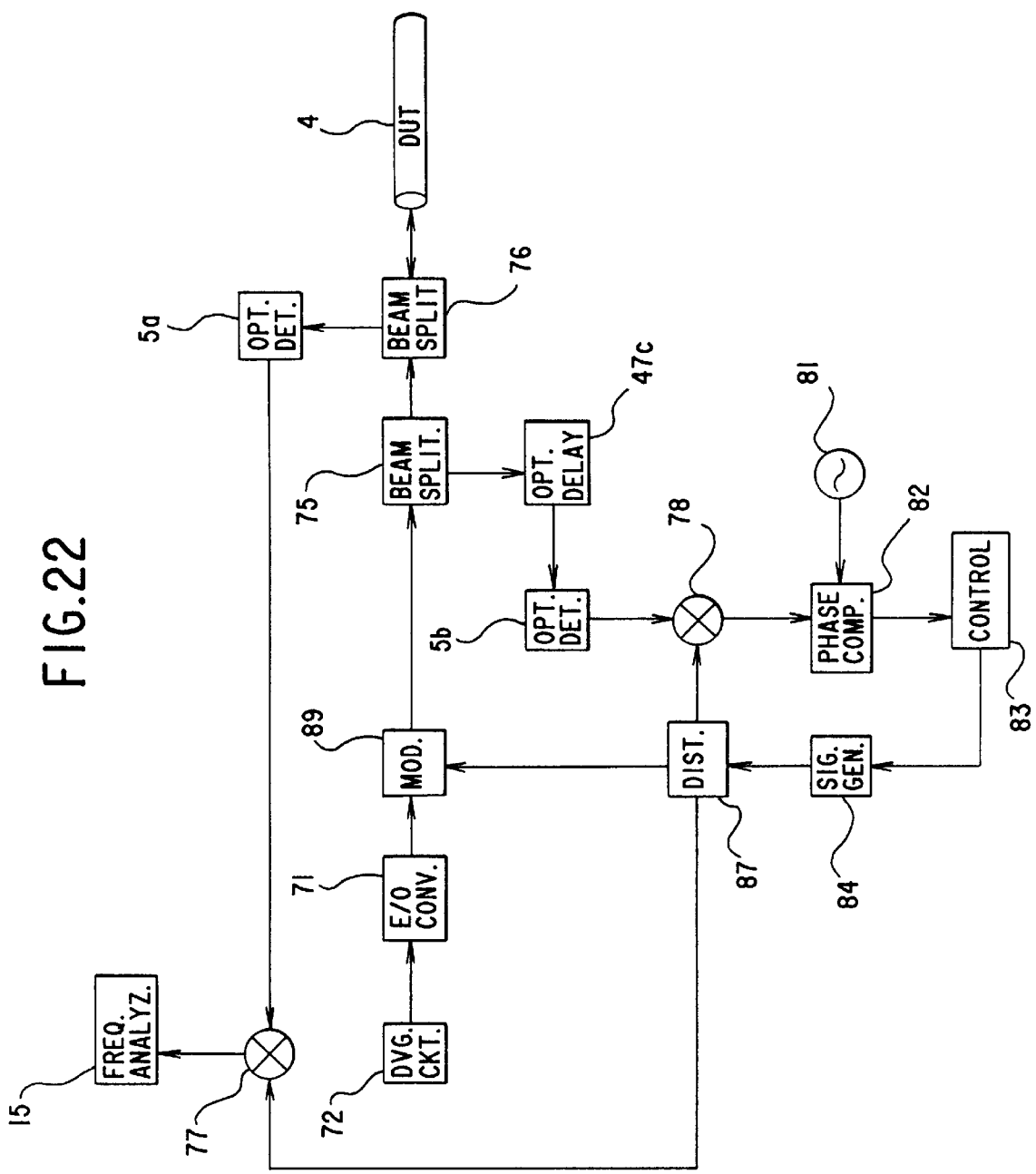

FIG. 22 shows the configuration of an optical-fiber inspection device in a seventeenth embodiment of the present invention, in which the intensity-modulated frequency of the output light of E/O converter 71 is controlled by applying the output of distributor 87 to intensity-modulator 89. The device of this configuration can also control linear sweeping of the light intensity-modulation frequency in a similar manner.

Figure 23:
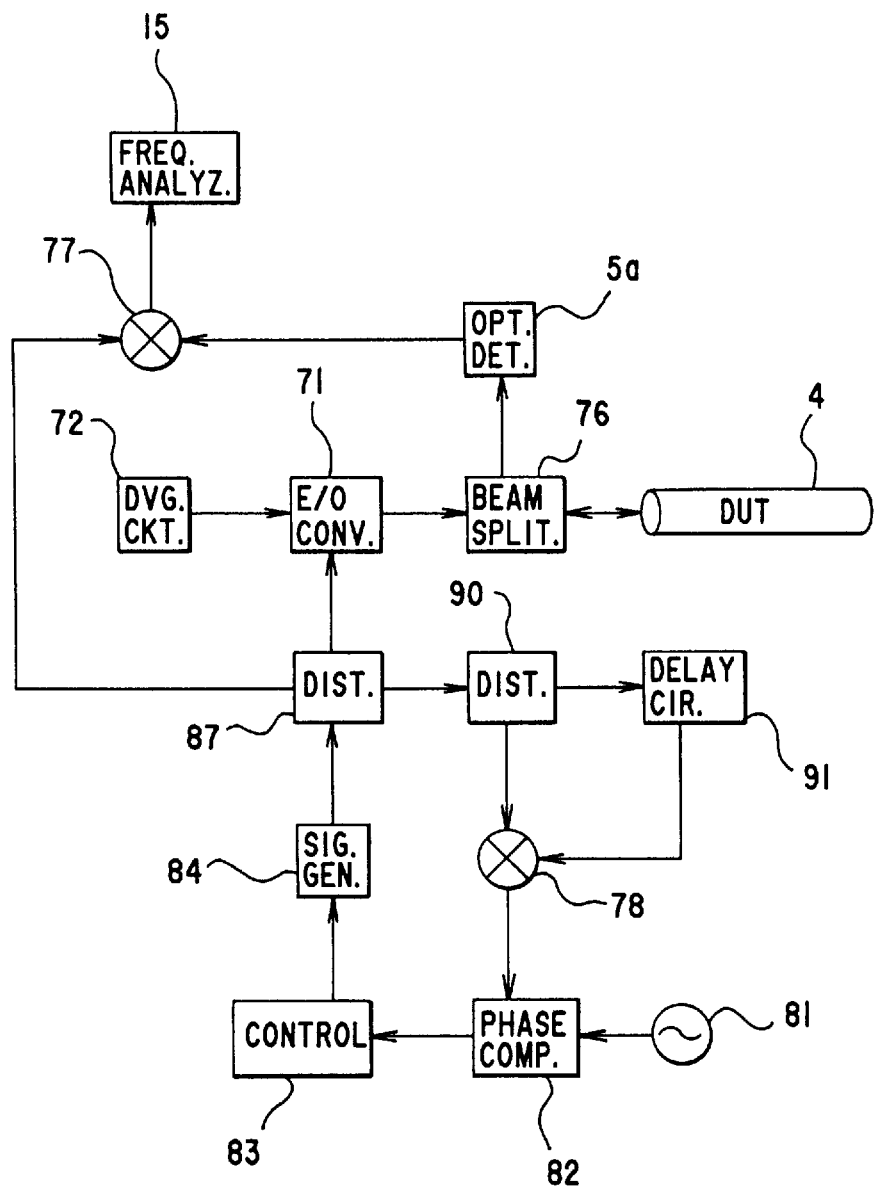

FIG. 23 shows the configuration of an optical-fiber inspection device in an eighteenth embodiment of the present invention, in which control of the linear sweeping of the light intensity-modulation frequency utilizing a delay in the drive signal not using a delay in the optical signal. The output of distributor 87 is further input to distributor 90 and one distributed output of distributor 90 is passed through delay circuit 91, mixed with the other distributor output in mixer 78 and the mixer output is input to phase comparator 82.

Although, in this embodiment, distributor 87 and distributor 90 are provided separately, one distributor may suffice if a multi-output distributor is used.

Figure 24:
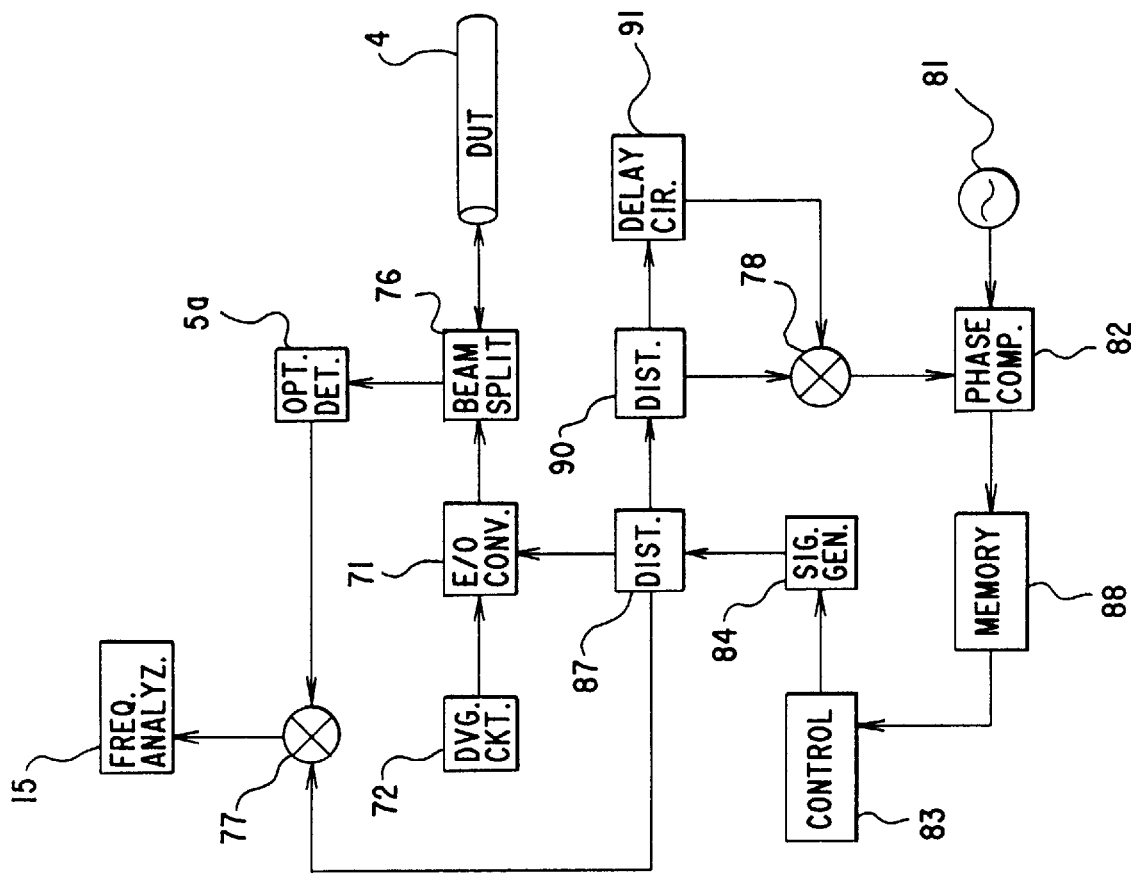

FIG. 24 shows a nineteenth embodiment of the present invention, in which the configuration shown in FIG. 23 is modified so as to store the output of phase comparator in memory 88.

Figure 25:
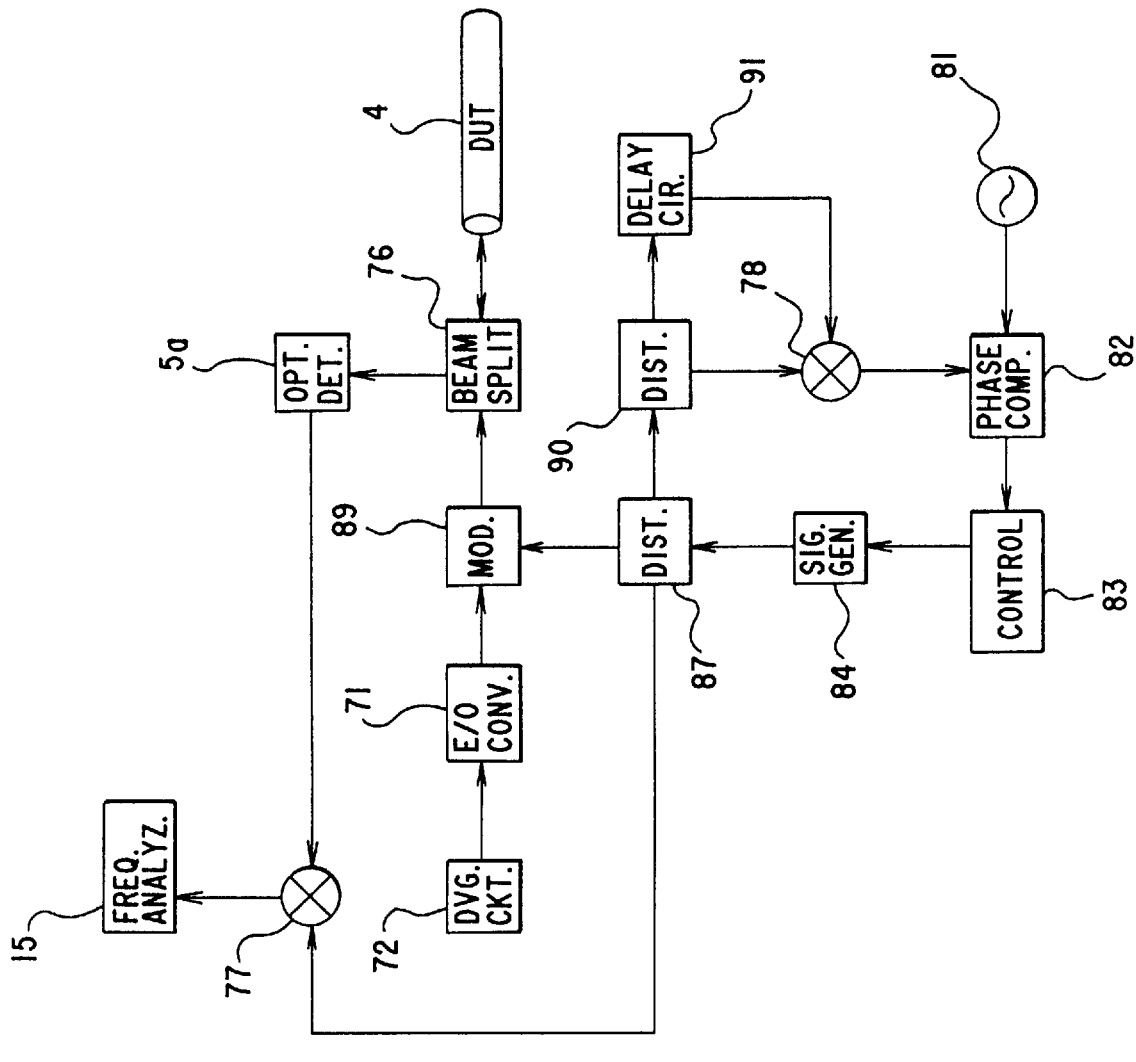

FIG. 25 shows a twentieth embodiment of the present invention, in which the configuration shown in FIG. 23 is modified so as to input the output of distributor 87 to intensity modulator 89 that modulates the output of E/O converter 71 to control linear sweeping of the frequency modulating the light intensity.

Figure 26:
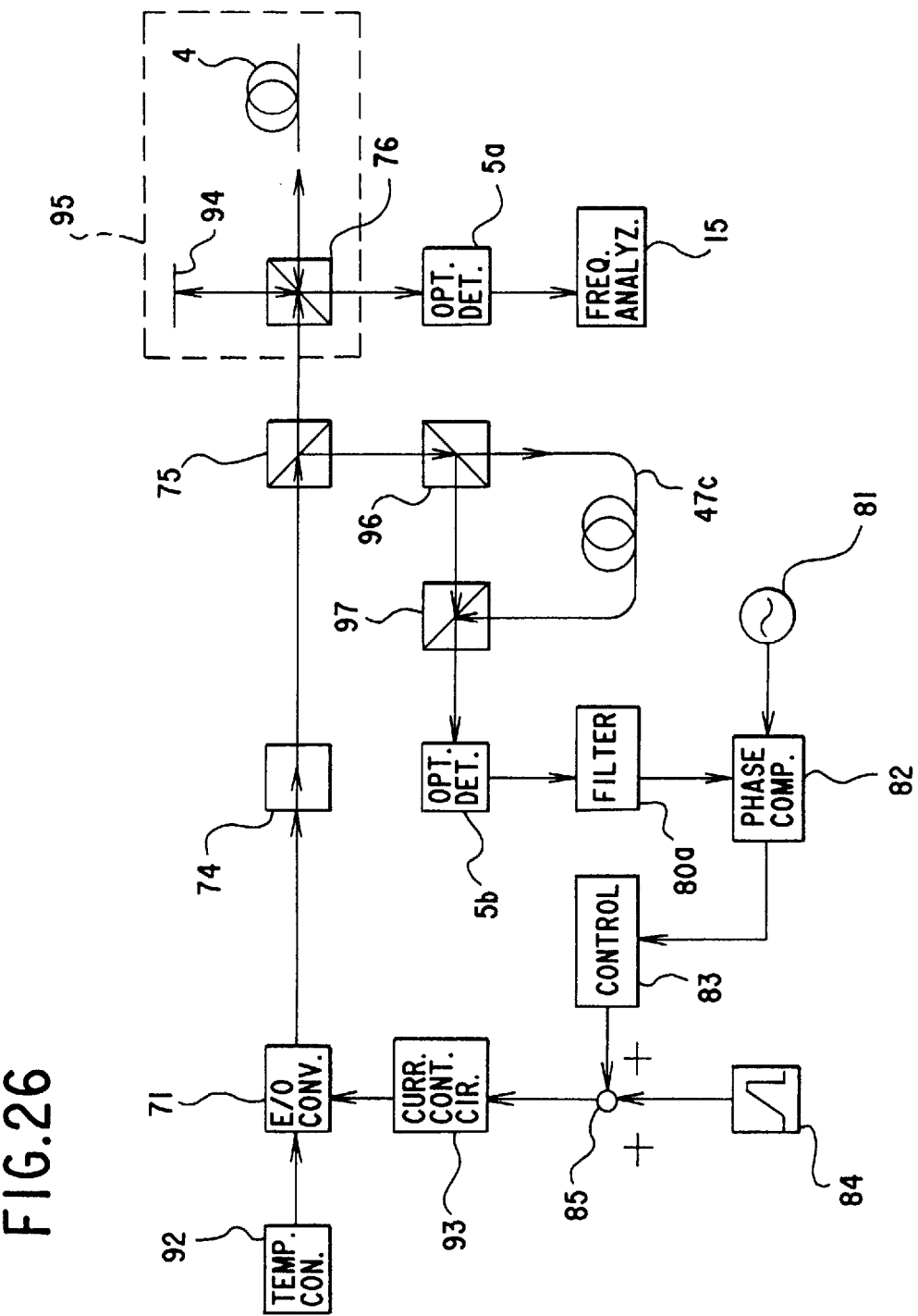

FIG. 26 shows the configuration of an optical-fiber inspection device in a twenty-first embodiment of the present invention, in which the optical frequency is swept by driving and controlling the E/O converter with the current and temperature. In this configuration, the control of linear sweeping of the optical frequency is possible by detecting the optical frequency change per unit time.

In FIG. 26, number 92 shows the temperature control circuit to control the temperature of E/O converter 71, 93 a current control circuit to control the driving current of E/O converter 71, and 74 an optical isolator. In addition, a block composed of mirror 94, beam splitter 76, and optical fiber 4 constitute Michelson interferometer 95.

Number 96 shows a beam splitter to branch the light and 97 indicates an optical combiner to combine the output light of beam splitter 96 and the output light of delay circuit 47c.

In this configuration, a block composed of beam splitters 75 and 96, delay circuit 47c, optical combiner 97, optical detector 5b, band-pass filter 80a, oscillator 81, phase comparator 82, and control circuit 83 is called a linear sweeping control means. In the device of such a configuration, like the description for the theoretical configuration in FIG. 1, there is a time difference $$\Delta t = 2 \cdot n \cdot L / c_0$$

where n: Refractive index of optical fiber 4
$c_0$: Speed of light in a vacuum between the light reflected at the fault point and the light reflected at mirror 94, and by optical detector 5a, interference fringes, the number of which is equal to the frequency change during time difference $\Delta t$, $$\Delta f = a \cdot \Delta t = 2 \cdot a \cdot n \cdot L / c_0,$$

are detected per unit time. The frequency and signal intensity of the output of optical detector 5a are analyzed with frequency analyzer 15.

On the other hand, control circuit 83 outputs control signals so that the frequency of the signal output from optical detector 5b becomes constant based on the output signal of phase comparator 82. The control signal output from control circuit 83 is added to the output of modulation signal generator 84 in adder 85 and is input to current control circuit 93. In addition, in this embodiment, there is no problem in operation if, for example, optical isolator 74 or band-pass filter 80a is not used. Adder 85 may also be configured to be included in current control circuit 93. Also, as delay circuit 47c, a section of optical waveguide may be used.

Figure 27:
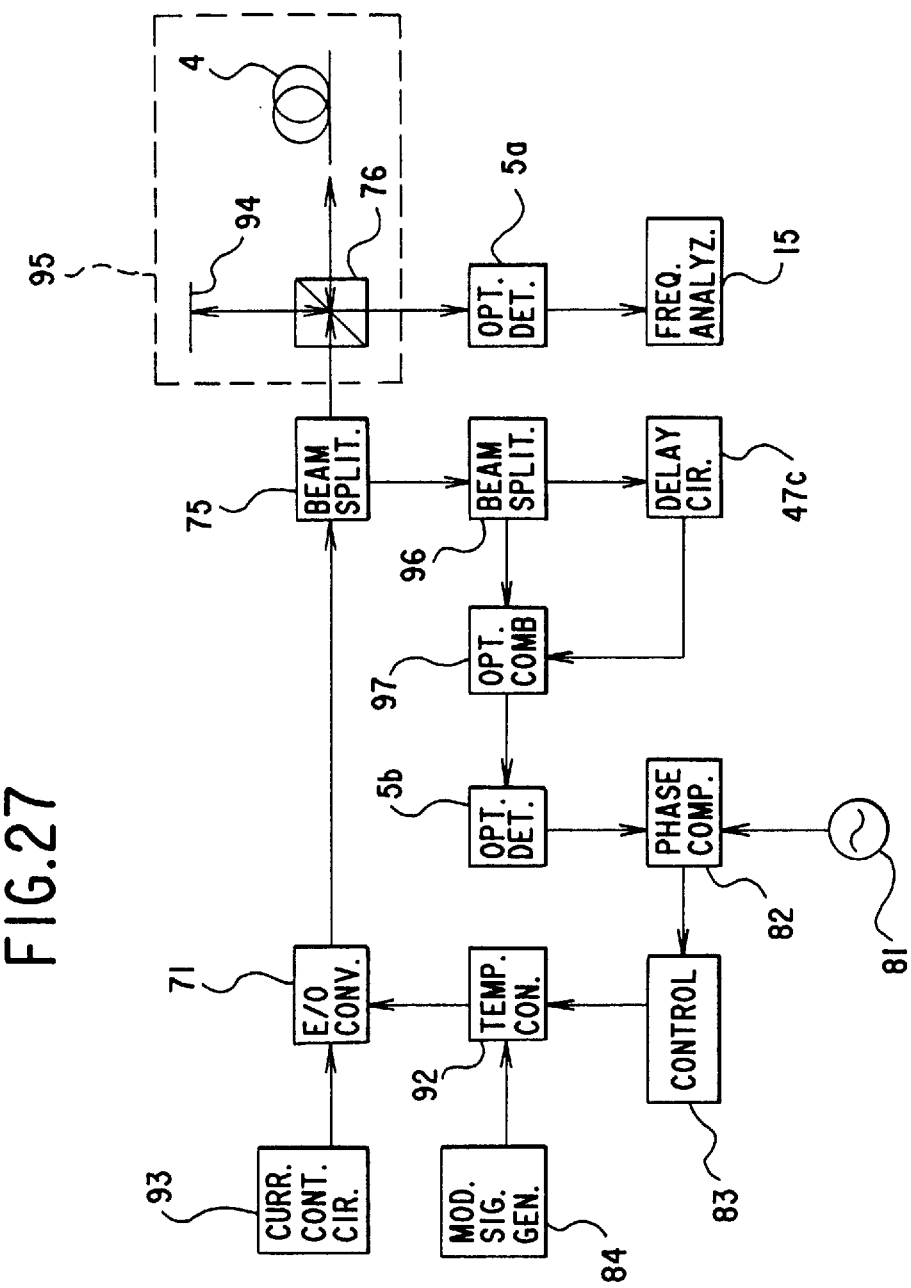

Further, as shown in FIG. 27 which indicates a configuration of an optical-fiber inspection device in a twenty-second embodiment of the present invention, a configuration where temperature control circuit 92 is driven by the output of modulation signal generator 84 and by the output of control circuit 83 may be used.

Figure 28:
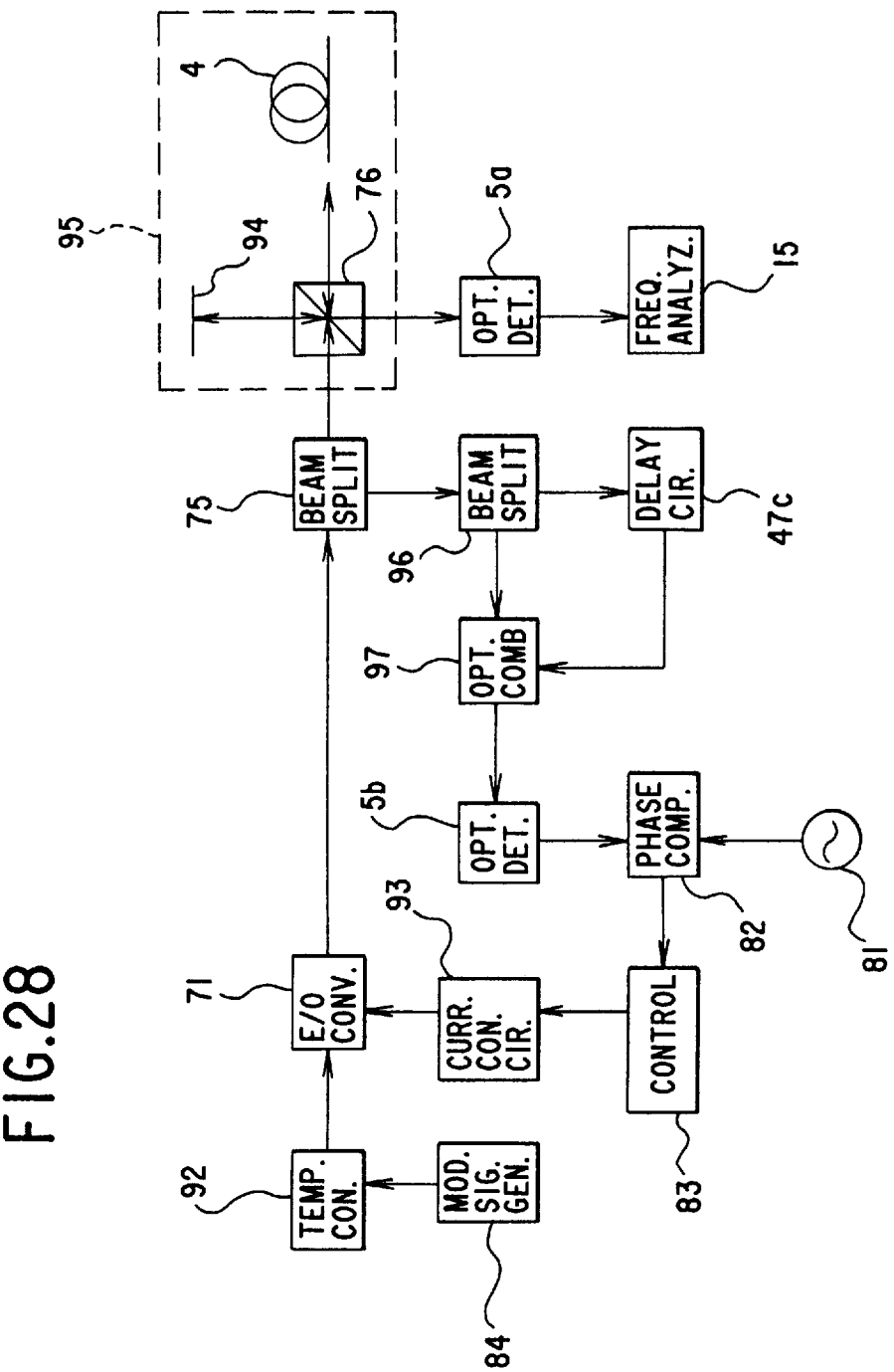

FIG. 28 shows a configuration of an optical-fiber inspection device in a twenty-third embodiment of the present invention. The difference between the configuration in this embodiment and the configuration in the twenty-first embodiment shown in FIG. 26 is that temperature control circuit 92 is driven directly by the output of modulation signal generator 84. Such a configuration can also sweep the optical frequency linearly as well.

Figure 29:
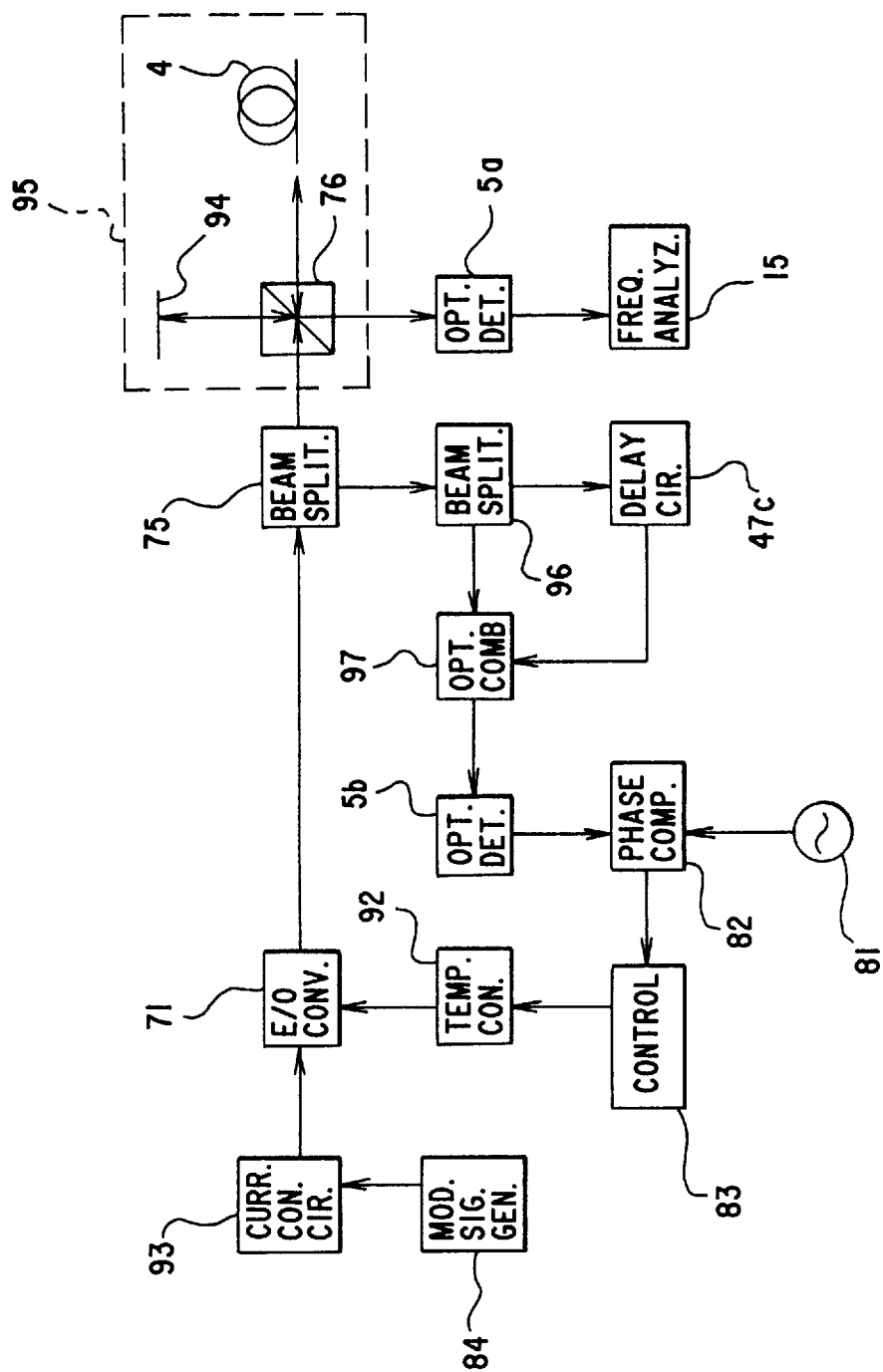

FIG. 29 shows a configuration of an optical-fiber inspection device in a twenty-fourth embodiment of the present invention. This is an example of a configuration where the output of control circuit 83 is applied to temperature control circuit 92 and the output of modulation signal generator 84 is applied to current control circuit 93.

Figure 30:
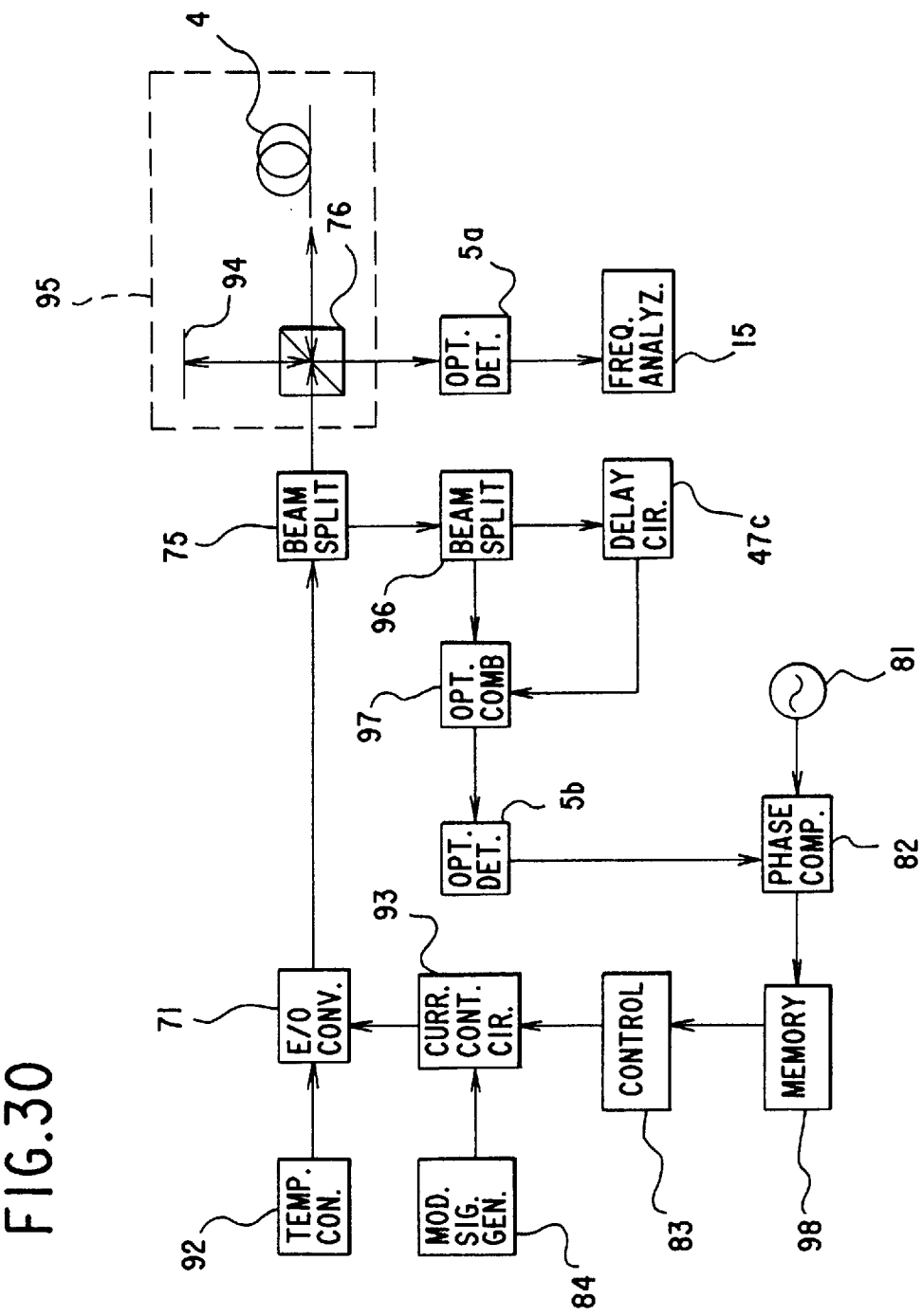

FIG. 30 shows a configuration of an optical-fiber inspection device in a twenty-fifth embodiment of the present invention. This configuration is obtained by adding memory 98 to the configuration shown in FIG. 26. In this configuration, the output of phase comparator 82 is stored in memory 98, i.e., the results of frequency sweeping are stored and the output of modulation signal generator 84 is corrected with control circuit 83 so that the modulation frequency is swept linearly based on the above sweeping results.

Figure 31:
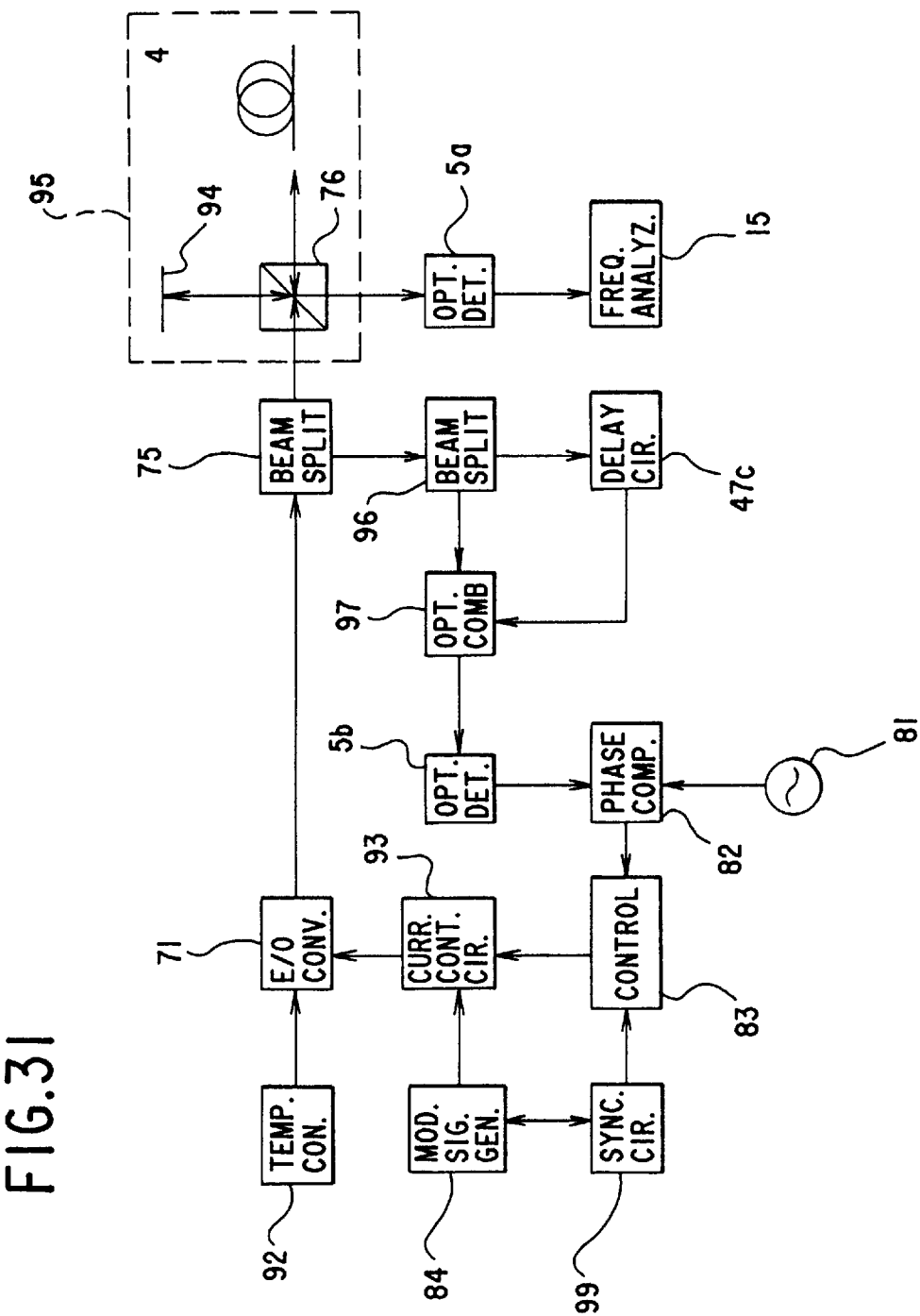

FIG. 31 shows a configuration of an optical-fiber inspection device in a twenty-sixth embodiment of the present invention, which is obtained by adding synchronizing circuit 99 to the configuration shown in FIG. 30. If ramp wave-modulation is to be repeated, a synchronizing signal synchronous with a repeat of the modulation signal generated by modulation signal generator 84 is applied to control circuit 83 from synchronizing circuit 99 to carry out the control synchronized with the start and stop of ramp-wave generation.

Figure 32:
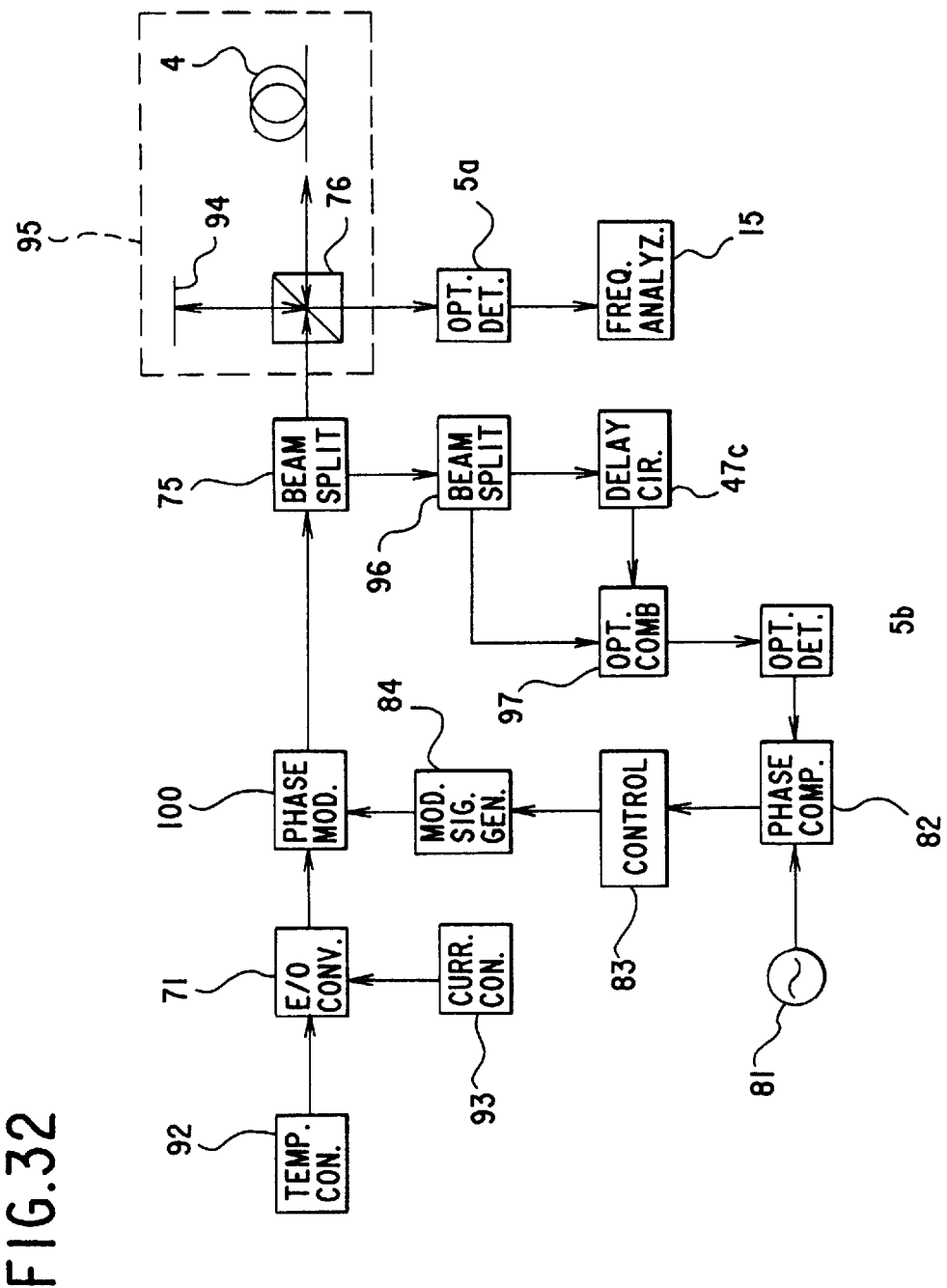

FIG. 32 shows a configuration of an optical-fiber inspection device in a twenty-seventh embodiment of the present invention. In this configuration, phase modulator 100 to phase-modulate the output of E/O converter 71 is provided to be controlled with the output of modulation signal generator 84. In addition, a section of polarization-holding optical fiber may be used for delay circuit 47c used for the purpose of an optical delay. By using such an optical-fiber, the deflection of light incident to optical combiner 97 can be controlled. Thus, this can improve the S/N ratio of the output signal of the optical detector.

What is claimed is:

1. In an optical fiber inspection device utilizing an optical frequency domain reflectometer for detecting distance to a reflection point within a device under test, said device comprising:

a sweep oscillator for producing oscillator signals;

an intensity modified E/O converter connected to said sweep oscillator for converting the oscillator signals into light signals;

an optical coupler connected between the E/O converter and the device under test for applying the light signals from the E/O converter to the device under test with the light signals being reflected by the reflection point within the device under test;

an O/E converter connected to said optical coupler for converting the reflected light from the optical coupler into electrical signals;

a mixer connected to said sweep oscillator and to the O/E converter for obtaining a frequency difference signal by mixing said electrical signals and the oscillator signals; and frequency analyzing means for analyzing the frequency difference to thereby obtain an output signal indicative of the distance to the reflection point in the device under test; the improvement comprising frequency shifting means for shifting frequency of the electrical signals from the O/E converter to a frequency range whereat said frequency analyzer means provides optimal analysis.

2. The device of claim 1, wherein said frequency shifting means comprises a section optical fiber connected between said optical coupler and said device under test so that the frequency range is shifted upward.

3. The device of claim 1, wherein said frequency shifting means comprises an analog delay element connected between said mixer and said O/E converter so that the frequency range is shifted upward.

4. The device of claim 1, wherein said frequency shifting means comprises a second mixer connected between said mixer and said frequency analyzing means and a second sweep oscillator for generating a signal applied to said second mixer so that the frequency range is shifted upward.

5. The device of claim 1, wherein said frequency shifting means comprises an analog delay element connected between said mixer and said O/E converter so that the frequency range is shifted downward.

6. The device of claim 1, wherein said frequency shifting means comprises a second mixer connected between said mixer and said frequency analyzing means and a second sweep oscillator for generating a signal applied to said second mixer so that the frequency range is shifted downward.

* * * * *